US008781622B2

(12) United States Patent
Mockus et al.

(10) Patent No.: US 8,781,622 B2
(45) Date of Patent: *Jul. 15, 2014

(54) MOBILE DEVICE ASSISTED RETAIL SYSTEM AND PROCESS IN A VENDING UNIT, RETAIL DISPLAY OR AUTOMATED RETAIL STORE

(75) Inventors: Darrell Scott Mockus, San Francisco, CA (US); Mara Clair Segal, San Francisco, CA (US)

(73) Assignee: Utique, Inc., San Francisco, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/150,930

(22) Filed: Jun. 1, 2011

(65) Prior Publication Data

US 2012/0029691 A1   Feb. 2, 2012

Related U.S. Application Data

(60) Provisional application No. 61/350,848, filed on Jun. 2, 2010.

(51) Int. Cl.
  *G06F 17/00* (2006.01)
(52) U.S. Cl.
  USPC .......................................... 700/237; 700/232
(58) Field of Classification Search
  USPC ......................................................... 700/237
  See application file for complete search history.

(56) References Cited

U.S. PATENT DOCUMENTS

| 5,025,950 | A | 6/1991 | Trouteaud et al. |
| 5,509,573 | A | 4/1996 | Campoli |
| 5,831,862 | A | 11/1998 | Hetrick et al. |
| 6,980,886 | B2 * | 12/2005 | Shimoda et al. ............... 700/232 |
| 7,209,946 | B2 * | 4/2007 | Dowling ........................ 709/203 |
| 7,299,576 | B2 | 11/2007 | Martin et al. |
| 7,366,586 | B2 * | 4/2008 | Kaplan et al. .................. 700/241 |
| 7,383,099 | B2 | 6/2008 | Pollard et al. |
| 7,451,892 | B2 * | 11/2008 | Walker et al. .................. 221/237 |
| 7,584,868 | B2 | 9/2009 | Bauch et al. |
| 7,950,817 | B2 | 5/2011 | Zulim et al. |
| 8,082,061 | B2 | 12/2011 | Segal et al. |
| 8,255,323 | B1 * | 8/2012 | Casey et al. ...................... 705/39 |
| 8,473,864 | B2 * | 6/2013 | Segal et al. .................... 715/810 |
| 2008/0201226 | A1 | 8/2008 | Carlson et al. |
| 2010/0103131 | A1 | 4/2010 | Segal et al. |
| 2010/0262282 | A1 | 10/2010 | Segal et al. |

FOREIGN PATENT DOCUMENTS

| JP | 2008/0506208 A | 2/2008 |
| JP | 2009/0501395 A | 1/2009 |
| JP | 2010/0033307 A | 2/2010 |

OTHER PUBLICATIONS

WO, International Search Report, PCT/US2011/038969, Dec. 27, 2011.

* cited by examiner

*Primary Examiner* — Timothy Waggoner
(74) *Attorney, Agent, or Firm* — One LLP

(57) ABSTRACT

Systems and methods for users of an automated retail store, vending unit, digital signage or interactive retail display (self-service units) to interact with such display/unit, collectively referred to in this text as a machine, directly and/or simultaneously using a one or more mobile devices. In addition, system and methods are provided that can recognize registered users within a set proximity to the machine and broadcast messages and notifications such as machine information, inventory information, rewards, discounts and free products, all of which could be tailored to the specific user based on understanding gathered through analysis of prior interactions.

31 Claims, 16 Drawing Sheets

MOBILE DEVICE ASSISTED RETAIL SYSTEM AND PROCESS IN A VENDING UNIT, RETAIL DISPLAY OR AUTOMATED RETAIL STORE

CROSS-REFERENCE TO RELATED APPLICATION

This application claims the benefit of U.S. Provisional Application Ser. No. 61/350,848 filed Jun. 2, 2010, and entitled "Mobile Device Assisted Retail System and Process in a Vending Unit, Retail Display or Automated Retail Store", which is incorporated herein by reference.

BACKGROUND OF THE INVENTION

1. Field of the Invention

The present invention relates generally to automated vending machines. More specifically, the present invention relates to using a mobile device to interact with an automated retail store, kiosk, vending unit, automated retail display or point of sale equipment to 1) deliver additional information and promotional advertising via a mobile device which specifically correlates with the aforementioned store, unit, automated display or equipment, or network thereof and 2) to provide a means for a user to learn about, reserve or purchase merchandise for sale that the user can later retrieve by authenticating the reservation or purchase on the aforementioned automated retail store, kiosk, vending unit, automated retail display, point of sale equipment or network thereof.

2. Description of the Related Art

Numerous prior art vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or computers and virtual interfaces. These new vending platforms have emerged in the marketplace under the popular descriptions "automated retail," "interactive retail," and/or "interactive retail displays." Such vending machines may be deployed within a variety of commercial or public settings. They typically include illuminated displays that seek to showcase merchandise and offer convenient purchasing. However, given products are typically housed behind a barrier of glass or plastic, there is limited information readily available beyond what is displayed on the front of the packaging. The capability to read additional surfaces of packaging to gather additional information is inhibited. Digital touch screens with product information have begun to supplement the display of physical products behind glass in order to offer more detailed information and automated purchasing features. However, these touch screen interactions are limited to a single user at a time leading to queues and potentially limiting service. Additional known disadvantages of these displays include a "mechanical" appearance and unintuitive or inefficient presentation of information. Within this, systems to date lack a clear display architecture that is consistent across the physical product display (merchandising area) and the virtual display of products whether on mobile devices or at the unit, display, or machine. Without said architecture, selection of products can be more cumbersome and lead to human error.

Automated retail stores, vending machines, and/or retail display platforms still look and feel like large, unfriendly machines or "mechanical boxes." Such machines provide potential customers with a cold, impersonal and indifferent impression, which is not conducive to maximizing sales.

Such prior art vending machines lack the sophistication of traditional retail stores in both the end user and retail display experience. This is due to the standard lighting, interfaces, and display mechanisms within these platforms.

Displays are limited in the amount of information that can be communicated about a product. They are limited by space and packaging constraints. Further, they fail to provide the depth of information found in many e-commerce portals. Additionally, information on products within traditional automated retail/vending platforms has historically been limited to either the virtual touch screen or the physical display and there is no perceptual link between touch screen information and products being displayed, beyond digital product images on the touch screen.

Current adaptations of automated retail units are assembled as single integrated, or stand-alone store units with merchandising displays and mechanical components integrated into a single platform. Historically, vending and automated retail machines did not have a method or process for connecting users to previous sales, preferences and reward programs. In addition, vending and automated retail machines did not have a method for identifying, or recognizing a user in order to efficiently and enjoyably service them at the display/machine whether they are proximal to or utilizing the machine.

Generally speaking this platform takes the form of an interface with a single touch screen with limited peripherals (such as a keyboard). This makes entering complex data (usernames, passwords, addresses, preference information) difficult and limits usage to one customer at a time.

There is great value in having the capability for a user to interact with a machine via a mobile (or secondary handheld) device. Currently, automated retail, vending and retail display machines tend to have only one interface limiting interaction to a single user at a time. Having the capability for several users on mobile devices to interact with a single machine or network of machine(s) connected to a centralized system is highly beneficial for several reasons; mobile device or handheld connectivity capability can increase the number of people gaining information and transacting from a single machine in real time from one to several. Users can begin the shopping process while waiting in a queue, in proximity to a machine or unit, or merely engaging via their handheld with the intention to approach a machine or unit at a later time to complete retrieval of their product selection(s). The user can retrieve valuable information and complete a transaction up to the point of physical product retrieval to increase efficiency of their transaction without having to be at the machine or unit. This is not only more cost efficient than deploying multiple expensive machines, but it also adds several key benefits including; another layer of interaction to engage users, a decrease in unit/machine wait times, and enhanced customer service by providing additional opportunities for the consumer to transact and educate themselves at their own convenience.

Historically, it has been shown that customers will lose interest in a retail experience when lines or queues exist, or appear lengthy. Most pronounced in impulse and convenience purchases, the ability to capture a consumer's attention and efficiently enable a transaction is the difference between making a sale or losing one. A vending unit or retail self service machine that allows a multitude of consumers to retrieve product information and purchase products simultaneously provides a marked benefit over units that are constricted to a single user interface where only one user at a given time can use the machine.

In addition, a vending machine, automated retail store or retail display that can sense users with mobile devices who are within the vicinity of the machine can be an effective way of distributing relevant marketing communication and initiating contact with users. Users can opt to install software on their mobile devices that can read GPS coordinates and relay that to known locations of enabled machines via a centralized server. Users can also use a mobile enabled website to "check in" and relay their location. The web application would respond back to the user with any applicable machines close to their location. Alternatively, machines can also use Bluetooth or other short wave wireless communications such as WLAN (Wireless Local Area Network) to recognize users who have previously identified with any machine connected to the system. This communication link can be used to provide the consumers with product information, new product introductions, sales, promotions, etc. Consumer research has shown a direct correlation to point of sale promotional marketing in stimulating impulse buying.

It is thus desirable to provide a method and system for a plurality of users to interact with a single machine directly and/or simultaneously using one or more mobile devices. It is further desirable for this system to broadcast relevant retail messages to the mobile devices of consumers within an immediate proximity to an automated retail store, vending machine or interactive retail display. It is also desirable to use this method to promote new products, special offers and other promotions.

BRIEF SUMMARY OF THE INVENTION

This invention provides a system and method for users of an automated retail store, vending unit, digital signage or interactive retail display (self-service units) to interact with such display/unit, collectively referred to in this text as a machine, through a mobile device.

A mobile device (also known as cell phone device, handheld device, handheld computer, "Palmtop" or simply handheld) is a pocket-sized computing device, typically having a display screen with touch input, voice activated input or a miniature keyboard. In the case of the personal digital assistant (PDA) the input and output are combined into a touchscreen interface. Smartphones and PDAs are popular amongst those who require the assistance and convenience of a conventional computer, in environments where carrying one would not be practical. Enterprise digital assistants can further extend the available functionality for the business user by offering integrated data capture devices like barcode, RFID (Radio Frequency Identification) and smart card readers.

This invention uses a combination of one or more two-way communication wireless devices such as a wireless WLAN router, RFID tags or Bluetooth wireless sending and receiving unit that allows fluid interaction with a mobile device. It also includes of a centralized server and database connected via a wireless or wired connection that stores and communicates user, product, location and promotion information to any connected self-service machines.

Alternatively, communication with a mobile device is provided over a cellular carrier's network to the centralized server via a mobile (WAP) configured website or via SMS (Short Message Service) and MMS (Multimedia Messaging Service) messages which then communicate over a virtual network to a connected unit deployed in a publically accessible location.

This invention utilizes a software algorithm that can search registered user data records for matching cellular numbers, MAC (Media Access Control) Addresses or other identifying information.

The invention comprises an automated retail machine, vending unit or retail display equipped with a method for identifying the particular machine and individual pieces of merchandise available in the machine or from another location or website connected to the machine via an Internet connection that can be wireless or via a wire or cable.

A user can communicate with a machine in a number of methods both active and passive.

A user can actively choose to interface with a machine by initiating communication directly with the machine or to the machine through the central server in a variety of ways. In each method, a user identifies themselves with a unit by sending a message with their mobile number, mobile MAC address, user name, machine name or other identifying name that allows the machine to send a response back to the mobile device making the inquiry.

There are multiple ways for a user to actively communicate with a machine to accommodate for the variances in mobile device capabilities.

One method of communication utilizes sending messages to a centralized server that is synchronized with data from the local machine. This can be done either through a cellular network by utilizing SMS and MMS on a mobile carrier's network or through a cellular service's data network.

Messages may contain data about the machine or about an individual product, service or promotion associated with the local machine. To account for user preferences and various mobile capabilities, users may read, input and send identifiers that link to additional information in a variety of ways.

One method allows users to read labels on the machine that are linked to an item, promotion or machine. Labels can take the form of human readable alphanumeric characters that a user can input into their mobile device through any input device such as 10-key, touch screen or keyboard. They can also take the form of matrix codes, two-dimensional bar codes that a user can input into their mobile device by capturing the image through a camera function that is translated by software to extract the identifier and additional information encoded into the bar code.

For mobile devices with sensor reading capabilities, information can be directly communicated with the mobile device (examples of sensors include RFID, or infrared). A mobile device can read this sensor within the specified proximity. Once a user has an informational identifier, they can transmit this data to a machine or system where the informational identifier can be used to look up additional information and media. This can be done via software installed on a mobile device, through a mobile web site, or via a cellular network using standard cellular protocols.

Users can use any mobile device capable of sending SMS (text messages) or MMS (multimedia messages) to communicate with a machine via the centralized server to which the machine is connected. SMS messages can contain text of any identification sequence labeled on the machine. MMS messages can contain pictures taken of matrix codes or physical products in the machine. These messages are routed through the user's local carrier to a server that receives the message. The message is parsed to determine the sender's number and any additional information that was sent. If the user's mobile number is associated with a registered member account, additional benefits such as discounts, promotions and specials may be applied in addition to whatever other information that is being requested. Information that may be sent in a message includes machine identification number that is listed on the machine, product information number, picture of matrix code (two dimensional barcode), or promotional offer identification number or picture. The central server determines the codes sent by parsing them and pattern matching them to items and information stored in a data store such as database or file system. Codes are unique to a data item and follow a formatting scheme that allows them to be quickly parsed and processed.

Users with data service on their mobile devices can also use a mobile website to communicate with a machine. The mobile website provides browser-based access to a dedicated web application using a mobile device—such as a smartphone—connected to a wireless network. The mobile website allows a user to input information such as a machine identification number that is listed on the machine, product information number, picture of matrix code (two dimensional barcode), or promotional offer identification number or picture.

Alternatively, users with a data service on their mobile devices may run a mobile software application built for their mobile operating system that facilitates the communication between the mobile device and the machine or central server.

For the mobile website and mobile applications, merchandise data for a machine or retail display can be sent to that phone from the server or directly from the machine. This merchandise data, organized into a virtual planogram, can be used to virtually represent the physical display of the local machine. Users can then select the product, service or promotion that they are interested in by using the touch sensor capabilities of the mobile device and selecting the virtual image of the product. The process of selection is made more intuitive and efficient by providing physical delineation, or framing, between merchandise in the physical display design. The virtual display representation mimics the framing in the physical design. Information about the merchandise selection is rendered on the mobile device.

After a user has selected an item to view additional information on their mobile device, they may then select to purchase that item via their mobile device. Using either a mobile application installed on their mobile device or via a mobile web application viewable using their mobile device's mobile web browser, a user can select a product, submit payment information and receive a unique code that can later be used to retrieve a corresponding physical item from a vending unit. The availability of that item in the selected store is determined beforehand only presenting the user the ability to purchase if the recorded inventories indicate that the merchandise is available. The user is prompted to supply payment information to pay for the selected items. If the user is a previously registered user with the system and has payment information such as credit card information, banking information or other payment method already stored in the system, they may use that information to pay for the purchase.

The item(s) identifier(s) and the quantities of each item are sent to the central server for processing. The server handles payment authorization. If the authorization fails, the user is notified of the error and the transaction terminates. If the authorization is successful, a unique code is created that associates the transaction with a record of data indicating the store identifier, the merchandised purchased and any relevant user information such as a hash checksum of a credit card used for the purchase for increased security. A temporary hold is placed on that merchandise in the machine making it unavailable for purchase for a set period of time. This period of time is pre-determined by authorized company personnel and set in the system's configuration file. The system subsequently returns that code and a receipt of that purchase to the user's mobile device. The system will also supply a digital copy of that receipt to an email address, if provided.

The user can use that code to retrieve a product from the selected store at any time during the indicated time period. If the user does not redeem their product in the time period allotted, the transaction will be voided, the user will be refunded their purchase and the merchandise will be available for purchase again. The user making the transaction needs to enter their unique code into a specified area on a machine. The machine will validate the code with the central server. If the code is valid, the machine will vend the purchased merchandise, otherwise, it will display an error to the user.

In addition, this system can recognize registered users within a set proximity to the machine and broadcast messages and notifications such as machine information, inventory information, rewards, discounts and free products, all of which could be tailored to the specific user based on understanding gathered through analysis of prior interactions. This service is available to any user who has previously engaged with the system and either registered or accepted the necessary legal agreements that allow solicited correspondence and data collection.

There are multiple ways a user may be detected or make his or her presence known to a unit, store, vending unit or interactive retail display. A user using a mobile application installed on their mobile device can transmit their GPS coordinates to a central server that will use that information and geo-locate the user in reference to the closest unit. Alternatively, the application can either download and periodically update a list of machine or display locations and check against current GPS coordinates on the phone or a user can also manually choose to "check in" with the system updating their current location. The machine can also be outfitted with a physical device such as a Bluetooth, wireless (WiFi) station, or infrared sending and receiving. When a user comes within a readable proximity of a machine and the user launches the installed mobile application, the user's mobile device MAC address is automatically transferred as part of the standard protocol process of the wireless system. This MAC address is sent to the central server along with the machine identifier. This information is used to retrieve any relevant machine information along with any other relevant product or promotional information based on the user information supplied.

Again referencing the retrieval process and as detailed in the above-mentioned co-pending utility application, this information is then directed to the user through their mobile application. A user may also use the mobile browser capabilities of their mobile device to view a mobile web application. This web application can receive location information input and transmit the same information through their browser. Users may also send SMS messages containing location information to the central server which will return text based machine and promotion information. SMS messages can either have a machine ID contained within and labeled on the machine or GPS coordinates that can be translated by a central system to determine which machine is in closest proximity.

The preferred invention provides a system and method to inexpensively create and deploy an (incremental) inventory control procedure that accomplishes the following:

a) Allow users to obtain additional product and promotion information through their mobile devices;

b) Allow users with registered devices to receive notifications when they are within a close proximity to a unit;

c) Allows users to purchase a product through a mobile device for later pickup at a vending machine/automated retail machine.

Another advantage of the preferred system is that it enables additional interactive user experiences such as:

a) broadcast of pertinent information including: promotions, notifications, account or rewards information and sales to a registered user's mobile device and contact information based on a collection of aggregated data of the user's actions over a period of time b) up-sell or cross sell products that are related to the products, items or brands in which the user showed interest based on the recorded actions The invention comprises a series of merchandise display, promotional/digital signage, automated mechanical/dispensing, and/or transactional modules that can be assembled and configured to create an automated retail store, vending unit, or interactive retail display of any size and link together via a virtual integrated network. The invention allows for any consumer with a mobile device to interact with an automated retail store, vending machine or retail display.

Thus a basic object of our invention is to provide a more effective consumer retail experience of an automated retail store, vending unit or retail display.

Another object is to provide an accessible retail display in the form of a vending machine that uses a variety of methods to allow users to interact with a unit.

Other objects are as follows:

a) to provide a system that can easily and cost effectively allow users of a kiosk, vending unit, automated retail store, digital signage unit, POS system or similar self service system to communicate with the machine standing within close proximity by using a mobile device instead of having to use the machine's primary touch screen interface;

b) to provide an intuitive and efficient method for users to obtain information on any product being sold in an automated retail machine or interactive retail display via a mobile device;

c) to provide a method by which users can receive discounts, promotions or special offers delivered to their mobile devices when they are in a defined proximity to any unit;

d) to provide a method by which recognized or repeat users who have opted in for a user program can receive targeted and/or personalized discounts, promotions or special offers delivered to their mobile devices when they are in a defined proximity to any unit;

e) to provide a method for tracking user behavior via data collected in an automated retail network that can be accessed by mobile devices that can provide additional interactive user behavior;

f) to provide a process for leveraging behavior determined by usage data tracking in an automated retail network to deepen the relationship with the consumer by providing targeted recommendations and improved customer service for an automated retail machine delivered through a mobile device;

g) to provide a method that allows the use of user detection through registered user's mobile devices to track consumer actions and associate these actions with a consumer profile;

h) to provide a method that allows the recorded actions of a registered user to be used to customize the user's retail experience in an automated retail network using mobile devices to extend the user interface of machine;

i) to facilitate user interactions with the automated vending process or retail display via a mobile device by providing multiple connection methods for a user to communicate with the machine in order to obtain merchandise and machine information with greater efficiency;

j) to provide a method and system that allows a user to purchase merchandise via their mobile device and later retrieve their physical merchandise from a machine using a uniquely generated code;

k) to facilitate a mobile device virtualization of the automated retail shopping experience by providing methods and processes that mirror the actions of the touch screen shopping experience of an automated retail unit via a handheld device up to the point of dispensing the physical merchandise;

l) to provide a secure method for the transmittal of data between a centralized automated retail network, an automated retail machine, and a handheld device;

m) to provide a method to notify a user when they are in proximity of an automated retail machine based on a user's past preferences and behaviors;

n) to provide a method to retrieve information and purchase products from an automated retail machine without having to use the machine to select the merchandise or complete the payment;

o) to provide a method to interface with an automated retail machine or vending unit physical display via a mobile device by providing a system for interaction between the mobile device and the physical display;

p) to provide a method for personalization of an automated retail or vending unit shopping experience when accessed via a handheld unit;

q) to provide a method to allow a user to view information on a machine in different languages through their mobile device as a method of providing full access to users who speak different languages;

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
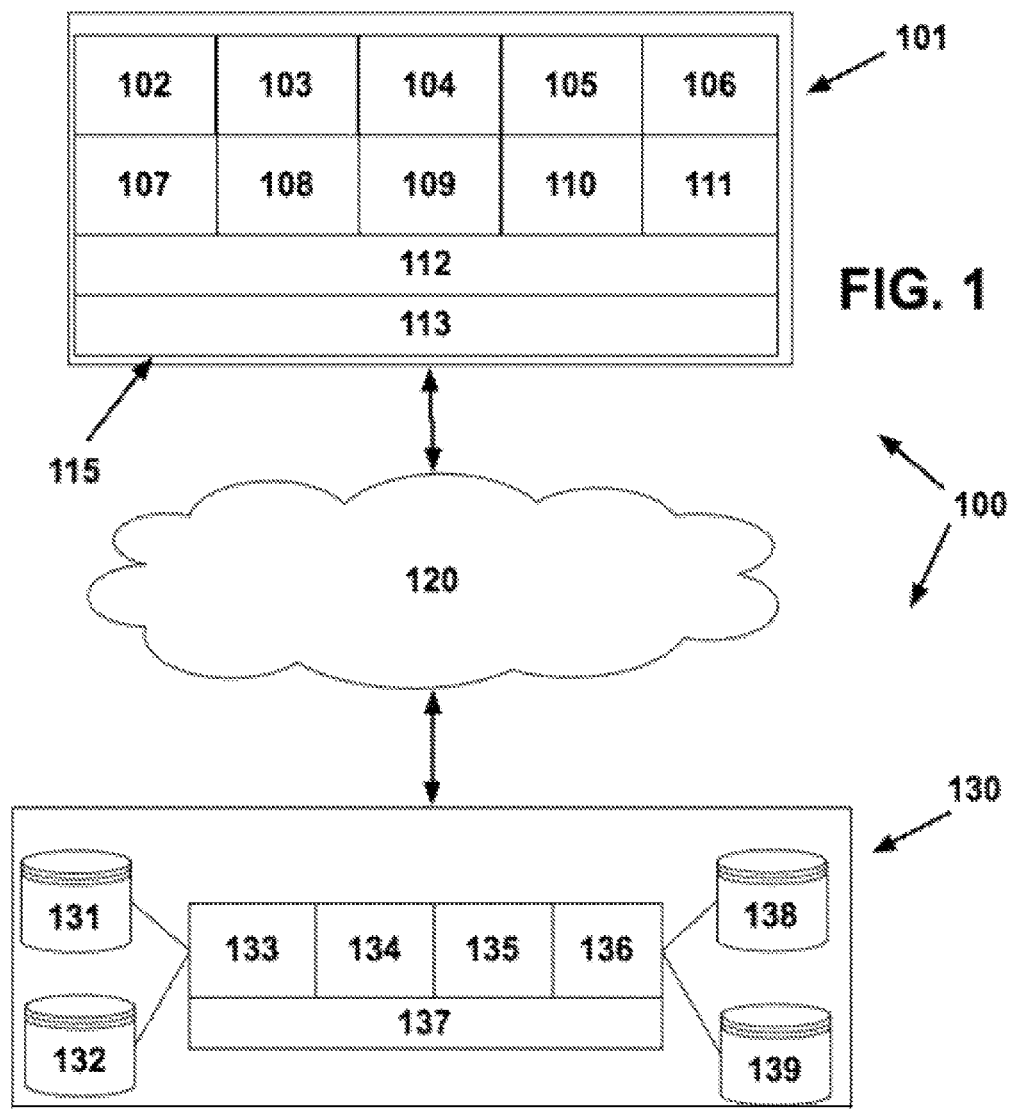
FIG. 1 is a block diagram of a system.
Figure 2:
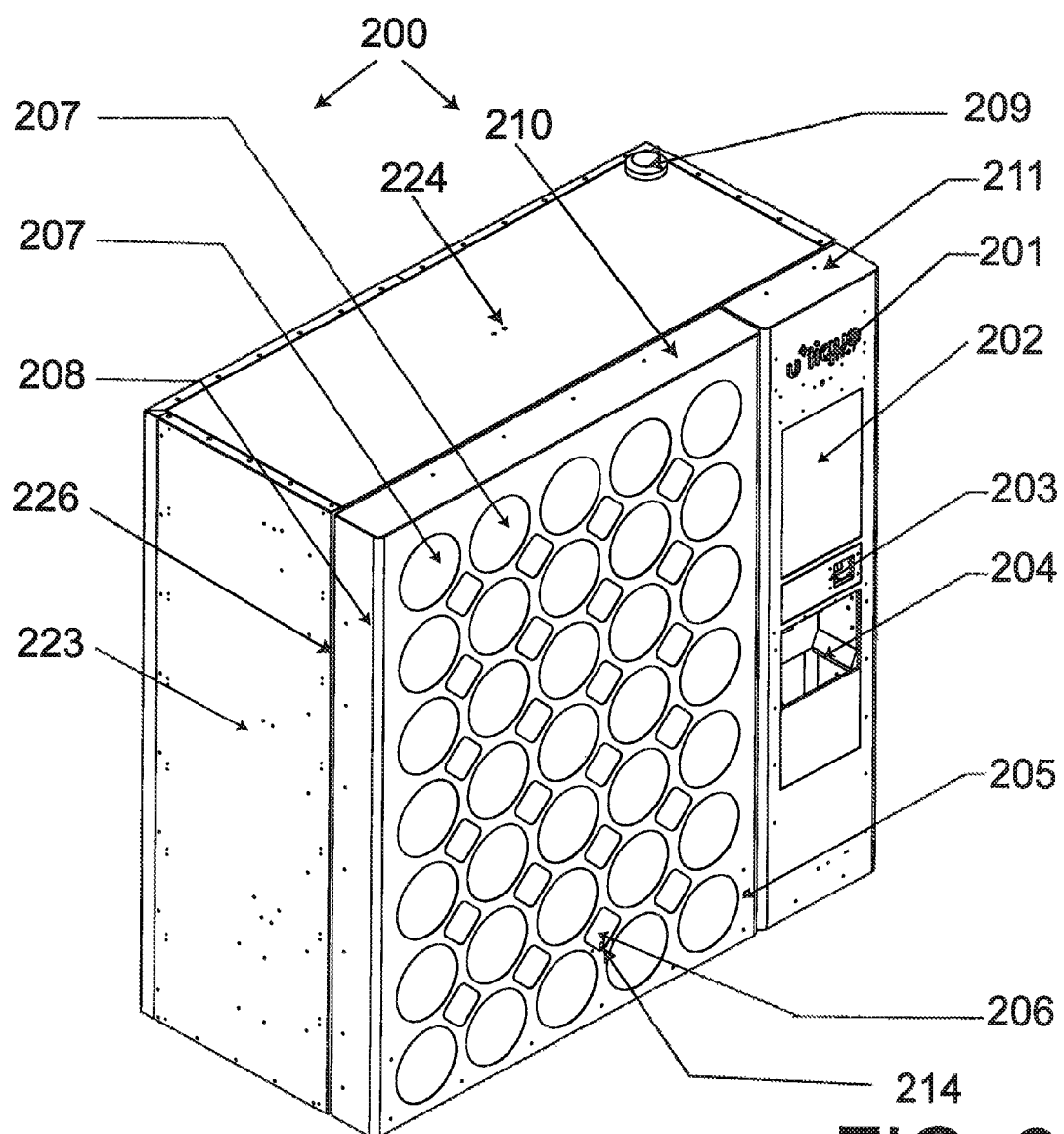
FIG. 2 is an isometric view of an assembled vending machine module.
Figure 3:
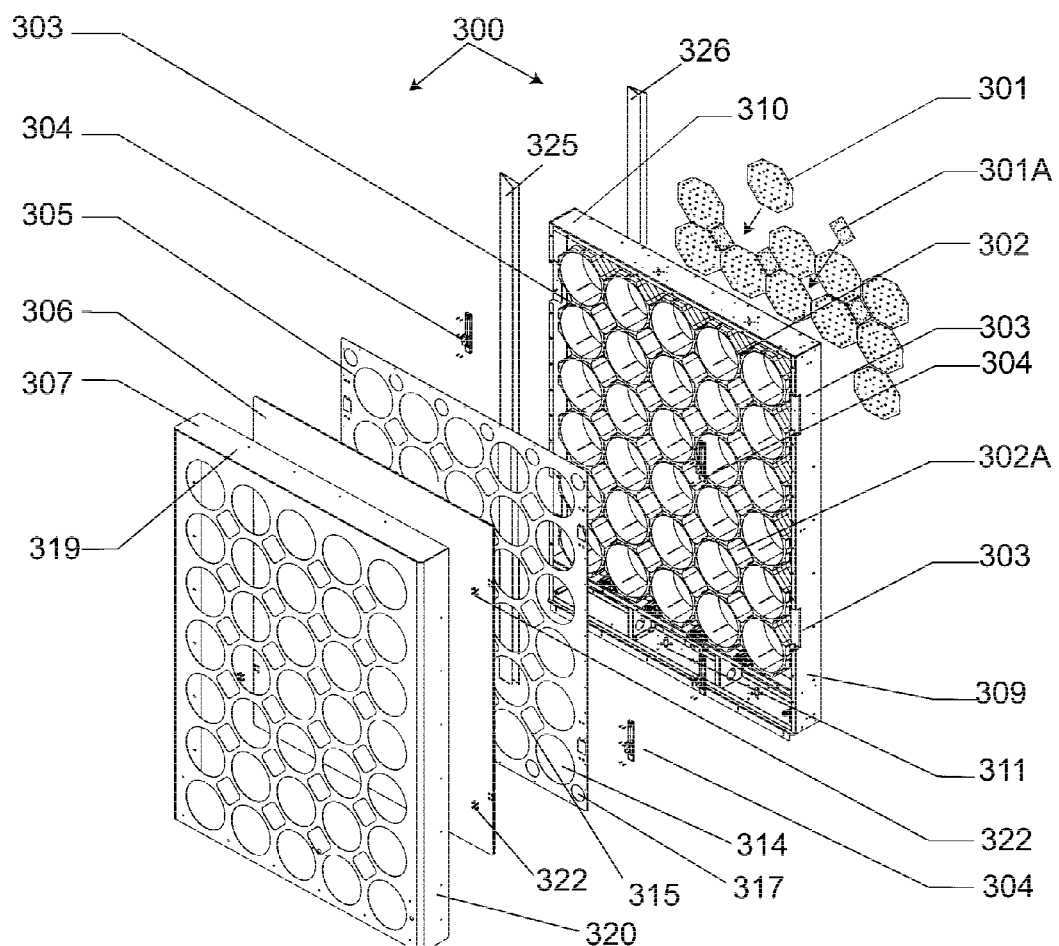
FIG. 3 is an exploded, isometric assembly view of a preferred display module assembly used with the vending machines of the invention.

With initial reference directed to FIGS. 1, 2 and 3 of the appended drawings, a system comprising a plurality of automated retail machines connected via a data connection to a centralized, backend operations center system has been generally designated by the reference numeral 100. At least one automated retail machine 101 is deployed in a physical environment accessible by a consumer who can interact with the machine 101 directly. There can be any number of machines 101, all connected to a single, remote logical operations center 130 via the Internet 120 (or a private network). The operations center 130 can physically reside in a number of locations to meet redundancy and scaling requirements.

The machine software is composed of a number of segments that all work in concert to provide an integrated system that all run on a computer 115. Logical area 102 provides the interface to deal with all of the machine's peripherals such as sensors, keypads, printers and touch screen. Area 103 handles the monitoring of the machine 101 and the notifications the machine 101 provides to administrative users when their attention is required. Area 104 controls the reporting and logging on the machine 101. All events on the machine 101 are logged and recorded so they can be analyzed later for marketing, sales and troubleshooting analysis. Logical area 105 is responsible for handling the machine's lighting controls.

Logical area 106 is the Inventory Management application. It allows administrative users on location to manage the inventory. This includes restocking the machine 101 with replacement merchandise and changing the merchandise that is sold inside the machine 101. Administrative users can set the location of stored merchandise and the quantity.

Logical area 107 is the retail store application. It is the primary area that the consumers use to interface with the system. This is the area that the majority of the processes described in FIGS. 6 and 11 occur. Logical area 108 handles the controls required to physically dispense items that are purchased on the machine 101 or physically dispense samples that are requested by a consumer. Logical area 109 controls the inventory management system allowing authorized administrative users to configure and manage the physical inventory in the machine 101. Area 110 controls the payment processing on the machine 101. It manages the communication from the machine 101 to external systems that authorize and process payments made on the machine 101. Area 111 is an administrative system that allows an authorized user to manage the content on the machine 101. This logical area handles the virtual administrative user interface described previously. The content can include text, images, video and any configuration files that determine the user's interaction with the machine 101.

The latter applications interface with the system through an application layer designated in FIG. 1 by the reference numeral 112. This application layer 112 handles the communication between all of these routines and the computer's operating system 113. Layer 112 provides security and lower level messaging capabilities. It also provides stability in monitoring the processes, ensuring they are active and properly functioning.

Logical area 131 is the user database repository that resides in the operations center 130. This repository is responsible for storing all of the registered user data that is described in the following figures. It is logically a single repository but physically can represent numerous hardware machines that run an integrated database. The campaign and promotions database and repository 132 stores all of the sales, promotions, specials, campaigns and deals that are executed on the system. Both of these databases directly interface with the real-time management system 133 that handles real-time requests described in later figures. Logical area 134 aggregates data across all of the databases and data repositories to perform inventory and sales reporting. The marketing management system 135 is used by administrative marketing personnel to manage the marketing messaging that occurs on the system; messages are deployed either to machines or to any e-commerce or digital portals. Logical area 136 monitors the deployed machines described in FIG. 2, and provides the tools to observe current status, troubleshoot errors and make remote fixes. Logical area 137 represents the general user interface portion of the system. This area has web tools that allow users to manage their profiles and purchase products, items and services. The content repository database 138 contains all of the content displayed on the machines and in the web portal. Logical area 139 is an aggregate of current and historical sales and usage databases comprised of the logs and reports produced by all of the machines in the field and the web portals.

An automated retail vending machine 200 that was represented logically as 101 in FIG. 1 is illustrated in FIG. 2. Detailed descriptions of the hardware and software for the vending machine 200 are explained in application Ser. No. 12/589,277, entitled "Interactive and 3-D Multi-Sensor Touch Selection Interface For an Automated Retail Store, Vending Machine, Digital Sign, or Retail Display," filed Oct. 21, 2009, which claims the benefit of provisional application Ser. No. 61/107,829, filed Oct. 23, 2008, and entitled "Interactive and 3-D Multi-Sensor Touch Selection Interface for an Automated Retail Store, Vending Machine, Digital Sign, or Retail Display;" application Ser. No. 12/589,164, entitled "Vending Machines With Lighting Interactivity And Item-Based Lighting Systems For Retail Display And Automated Retail Stores," filed Oct. 19, 2009, which claims the benefit of provisional application Ser. No. 61/106,952, filed Oct. 20, 2008, and entitled "Lighting Interactivity And Item-Based Lighting Systems In Retail Display, Automated Retail Stores And Vending Machines;" and application Ser. No. 12/798,803, entitled "Customer Retention System and Process in a Vending Unit, Retail Display or Automated Retail Store," filed Apr. 12, 2009, which claims the benefit of provisional application Ser. No. 61/168,838, filed Apr. 13, 2000, and entitled "Customer Retention System And Automated Retail Store (Kiosk, Vending Unit, Automated Retail Display And Point-Of-Sale)," which have been incorporated by reference herein as if set forth herein in full.

Display module 210 can be attached with a hinge 226 to a vending machine 200 comprised of a rigid upright cabinet with rigid sides 223 and top 224, or the module 210 can be mounted to a solid structure as a stand-alone retail display.

The display module 210 forms a door that is hinged to the cabinet sides 223 adjacent a vertical control column 211. A variety of door configurations known in the art can be employed. For example, the display doors 210 can be smaller or larger, and they can be located on one or both sides of the control column 211. The display doors 210 can have multiple square, oval, circular, diamond-shaped, rectangular or any other geometrically shaped windows. Alternatively, the display area can have one large display window with shelves inside.

A customizable, lighted logo area 201 (FIG. 2) is disposed at the top of column 211. Touch screen display 202 is located below area 201. Panel 203 locates the machine payment system, coin acceptor machine or the like. Additionally panel 203 can secure a receipt printer, keypad, headphone jack, fingerprint scanner or other access device. The product retrieval area 204 is disposed beneath the console 211 in a conventional compartment (not shown). A key lock 205, which can be mechanical or electrical such as a punch-key lock, is disposed beneath the face of the display module 210. One or more motion sensors 214 are disposed within smaller display tubes within the module interior. A plurality of generally circular product viewing areas 207 and a plurality of generally diamond shaped viewing areas 206 are defined upon the outer the face of the casing 208 that are aligned with internal display tubes behind the product viewing surface areas, though the shape of the viewing areas may alter with various merchandising concepts. However, the convention of framing merchandising offerings is consistent to enable intuitive interfacing whether a physical or virtual representation of the merchandise display. The reference numeral 209 designates an exterior antenna that connects to a wireless modem inside the machine providing connectivity.

With reference directed to FIGS. 2-3, a lighting system display module constructed in accordance with the best mode of the invention has been generally designated by the reference numeral 300 (FIG. 3). A vending machine console equipped with the display case lighting arrangement has been generally designated by the reference numeral 200 (FIG. 2). Lighting and display system 300 includes a variety of hardware and software adaptations to facilitate the various objects and advantages discussed above when integrated within a vending machine. Lighting effects are established by various circuits that control various LED-equipped circuit boards in response to software discussed hereinafter. Lighting circuit boards and components are disposed upon various product display and vending modules that are visible from the front of the vending machine 200 (FIG. 2).

A plurality of LED octagonal circuit boards 301 are arranged into geometric arrays and patterns in orderly rows and columns. Smaller, generally rectangular, secondary LED circuit boards 301A are arranged between LED boards 301. The shape of the boards 301, 301A is not critical, and they can be circular, triangular, rectangular, or other shapes, depending upon the artistic impression desired. Preferably the boards are polygonal, and in the best mode, they are octagonal. Boards 301, 301A are fastened within display case 303. A plurality of primary display tubes 302 arranged in an array comprising rows and columns line up with the LED circuit boards 301. The preferably, tubular plastic display tubes 302 have a generally circular cross section, into which the octagonal circuit boards 301 fit. A plurality of smaller, secondary display tubes 302A are disposed between larger display tubes 302 in an orderly fashion to register with rectangular LED circuit boards 301A. The tubes 302, 302A may assume other geometries, including cubicle form or parallelepiped shapes, as long as they can fit the item to be vended.

Display case 303 is generally rectangular, and box-like, comprising bordering sides 309, a top 310, and bottom 311, the width of which established a sufficient depth to shroud the display tubes 302 and related components.

A plurality of sensors 304 (FIG. 3) are coupled between selected display tubes 302. A plurality of preferably circular orifices 314 are defined in plate 305 to align with display tubes 302. Rectangular orifices 315 align with display tubes 302A. A plurality of smaller auxiliary orifices 317 are located about the periphery of extrusion cover mounting plate 305 for wiring.

A generally rectangular, translucent glass or plastic window 306 is secured over extrusion cover mounting plate 305 utilizing mounting orifices 322. Window 306 is preferably clear and translucent for visibility. Display case 303, cover mounting plate 305 and window 306 are secured in overlying relationship within the module 300 by a rigid exterior casing 307 that shrouds the apparatus. Casing top and bottom 319 and sides 320 comprise a plurality of spaced apart mounting holes for suitable fasteners. Casing 307 is attached to the display case 303 with a hinge 325 that allows access to the areas where the products are displayed.

Products being featured are stored within display tubes 302 and/or 302A for illumination in accordance with the lighting scheme described in detail below. Products to be vended are stored in the rear of the vending machine 200 (FIG. 2) in a conventional fashion, and payment is received via a credit or debit transaction or alternative payment method such as a coin or dollar input accomplished with conventional coin acceptance machines and conventional vending circuitry known to those with skill in the art. Selected products are vended though conventional passageways in the vending machine to which console 200 is mated.

The embodiment illustrated in FIG. 3 includes five columns and seven rows of displays, but alternative arrays with different number of rows and columns can be used. In addition, the shapes and sizes of the display windows and display tubes may vary as well.

Figure 4:
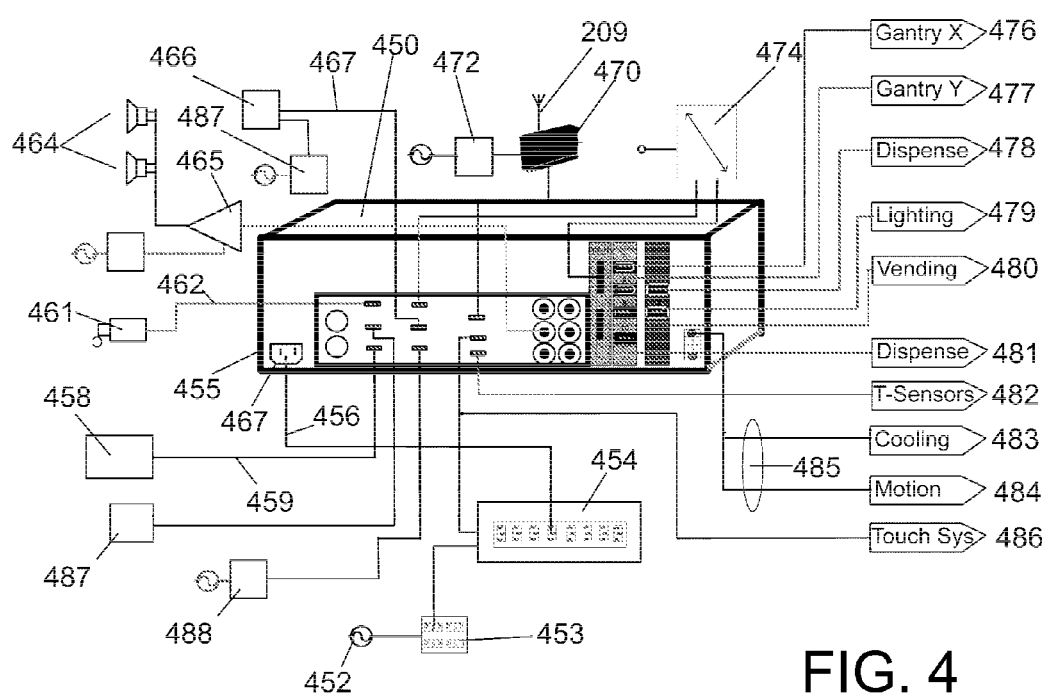
FIG. 4 is a diagrammatic view showing the preferred interconnection of the system computer and communication hardware.

FIGS. 4 and 5 illustrate system wiring to interconnect with a computer 450 such as, e.g., Advantech's computer engine with a 3 Ghz CPU, 1 GB of RAM memory, 320 GB 7200 RPM hard disk drive, twelve USB ports, at least one Serial port, and an audio output and microphone input. The computer 450 (FIGS. 4, 5) communicates to the lighting system network controller via line 479. Through these connections, the lighting system is integrated to the rest of system. Power is supplied through a plug 452 that powers an outlet 453, which in turn powers a UPS 454 such as, e.g., TripLite's UPS (900 W, 15 VA) (part number Smart1500LCD) that conditions source power, which is applied to input 455 via line 456. Power is available to accessories through outlet 453 and UPS 454.

Computer 450 (FIG. 4) is interconnected with a conventional payment reader 458 via cabling 459. An optional web-accessing camera 461 such as, e.g., a LOGITECH webcam (part number 961398-0403) connects to computer 450 via cabling 462. Audio is provided by transducers 464 such as, e.g., a Happ Controls four-inch speakers (part number 49-0228-00R) driven by audio amplifier 465 such a Happ Controls Kiosk 2-Channel Amplifier with enclosure (part number 49-5140-100) with approximately 8 Watts RMS per channel at 10% THD with an audio input through a 3.5 mm. stereo jack connected to computer 450. A receipt printer 466 such as, e.g., Epson's EU-T300 Thermal Printer connects to the computer 450 via cabling 467. The printer is powered by a low voltage power supply such as, e.g., Epson's 24VDC power supply (part number PS-180). A remote connection with the computer 450 is enabled by a cellular link 470 such as, e.g., Multitech's Verizon CDMA cellular modem (part number MTCBA-C-IP-N3-NAM) powered by low voltage power supply 472. The cellular link 470 is connected to an exterior antenna 209. A touch enabled liquid crystal display 474 such as, e.g., a Ceronix 22" Widescreen (16:10) Touch Monitor for computer operation also connects to computer 450. A Bluetooth adapter 487 such as, e.g., D-Link's DBT-120 Wireless Bluetooth 2.0 USB Adapter is attached to the computer 450 allowing it to send and receive Bluetooth communication. A wireless router 488 such as, e.g., Cisco-Linksys' WRT610N Simultaneous Dual-N Band Wireless Router is connected to the computer 450 to allow users to connect to the machine via a private network created by the router.

Digital connections are seen on the right of FIG. 4. Gantry-X, stepper motor controller such as, e.g., the Arcus Advanced Motion Driver+Controller USB/RS485 (part number Arcus ACE-SDE), and Gantry-Y stepper motor controller such as, e.g., the Arcus Advanced Motion Driver+Controller USB/RS485 (part number Arcus ACE-SDE) connections are designated by the reference numerals 476 and 477 respectively. Dispenser control output is designated by the reference numeral 478. LED lighting control signals communicate through USB cabling to a DMX controller 479 that transmits digital lighting control signals in the RS-485 protocol to the display tube lighting circuit board arrays. An ENTTEC-brand, model DMX USB Pro 512 I/F controller is suitable. Cabling 480 leads to vending control. Dispenser door control is effectuated via cabling 481. Touch sensor inputs arrive through interconnection 482. Cooling fans are controlled through cabling 483. Motion sensor inputs from a motion sensor such as, e.g., Digi's Watchport/D (part number Watchport/D 301-1146-01) are received through connection 484. Cabling connections 483 and 484 are shielded as indicated by reference numeral 485. The touch system is connected to the computer 450 via cabling 486.

Figure 5A:
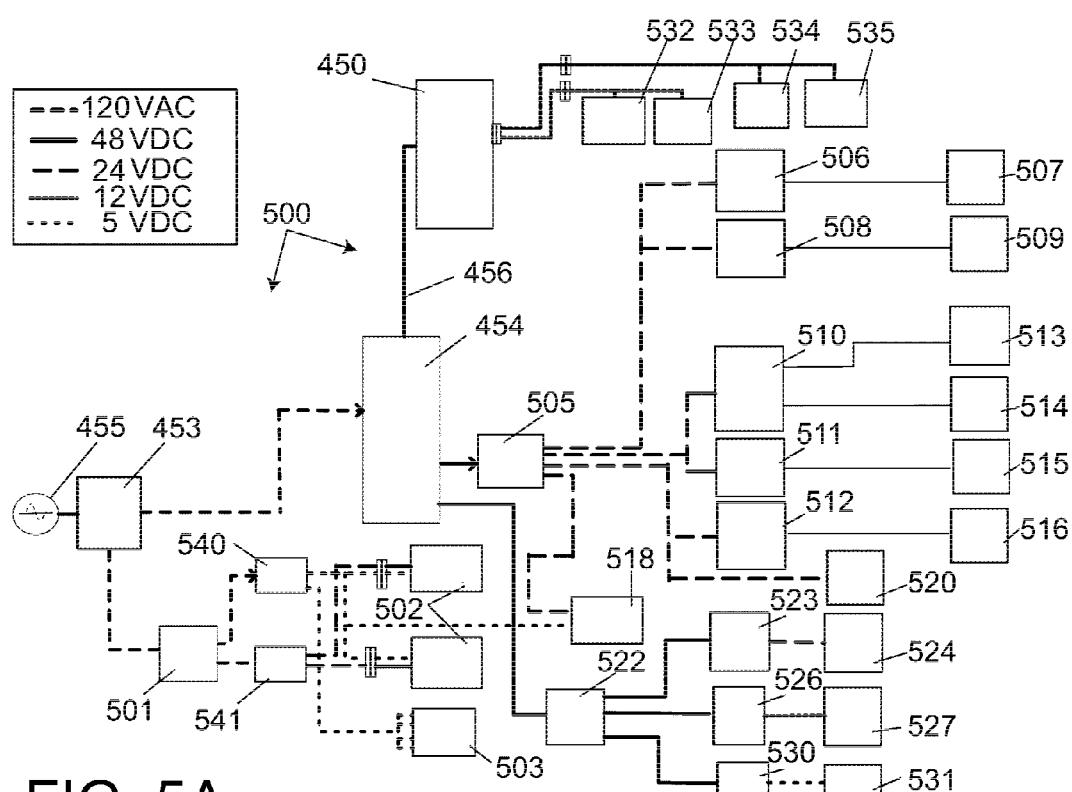
FIG. 5A is a block diagram of the preferred electrical power supply arrangement.

FIG. 5A illustrates a detailed power distribution arrangement 500. Because of the various components needed, power has to be converted to different voltages and currents throughout the entire system. The system is wired so that it can run from standard 110 V.A.C. power used in North America. It can be converted to run from 220 V.A.C. for deployments where necessary. Power from line-in 455 supplied through plug 452 (FIG. 4) powers a main junction box 453 with multiple outlets (FIGS. 4, 5) that powers UPS 454 which conditions source power, and outputs to computer 450 line 456. Power is available to accessories through main junction box 453 and Ground-fault current interrupt AC line-in 455. An additional AC outlet strip 501 such as, e.g., Triplite's six position power strip (part number TLM606NC) powers LED lighting circuits 502 and a touch system 503. Power is first converted to 5 volts to run the lighting board logic using a converter 540. Another converter, 541, converts the AC into 24 Volt power to run the lights and touch system.

An open frame power supply 505 (FIG. 5A) provides 24 VDC, 6.3 A, at 150 watts. Power supply 505 powers Y-controller 506 such as, e.g., the Arcus Advanced Motion Driver+Controller USB/RS485 (part number Arcus ACE-SDE), that connects to Y axis stepper 507. A suitable stepper 507 can be a Moons-brand stepper motor (part number Moons P/N 24HS5403-01N). Power supply 505 also connects to an X controller 508, which can be an Arcus-brand Advanced Motion Driver+Controller USB/RS485 (part number Arcus ACE-SDE), that connects to X axis stepper 509. A Moons-brand stepper motor (part number Moons P/N 24HS5403-01N) is suitable for stepper 509.

Power supply 505 (FIG. 5A) also powers dispenser controller 510, dispenser door control 511, and vending controller 512. Controller 510 powers gantry motor 513 and two conveyor motors 514 and 515. Motors 514 and 515 can be Canon-brand DC gear motors (part number 05S026-DG16). Door stepper motor 515 can be a Canon DC gear motor (part number 05S026-DG16). Controller 512 operates spiral motors 516 such as, e.g., the Vendapin Universal 24 volt DC gear motor (part number 605008-001). The logo space 201 (FIG. 2) is illuminated by lighting 518 (FIG. 5) powered by supply 505. Supply 505 also powers LCD touch screen block 520 (FIG. 5) such as, e.g., a Ceronix 22" Widescreen (16:10) Touch Monitor. UPS 454 (FIG. 5) also powers an AC outlet strip 522 that in turn powers a receipt printer power supply 523 such as, e.g., Epson's 24VDC power supply (part number PS-180) that energizes receipt printer 524 such as, e.g., Epson's EU-T300 Thermal Printer, an audio power supply that powers audio amplifier 527 such a Happ Controls Kiosk 2-Channel Amplifier with enclosure (part number 49-5140-100), and a low voltage cell modem power supply 530 that runs cellular modem 531 such as, e.g., Multitech's Verizon CDMA cellular modem (part number MTCBA-C-IP-N3-NAM). A proximity sensor 214 (FIG. 2) such as, e.g., a Digi Watchport/D part number 301-1146-01 is connected to the CPU 450. 532 is a door sensor and actuator such as, e.g., Hamlin's position and movement sensor (part 59125) and actuator (part 57125) which are connected to the CPU 450.

Figure 5B:
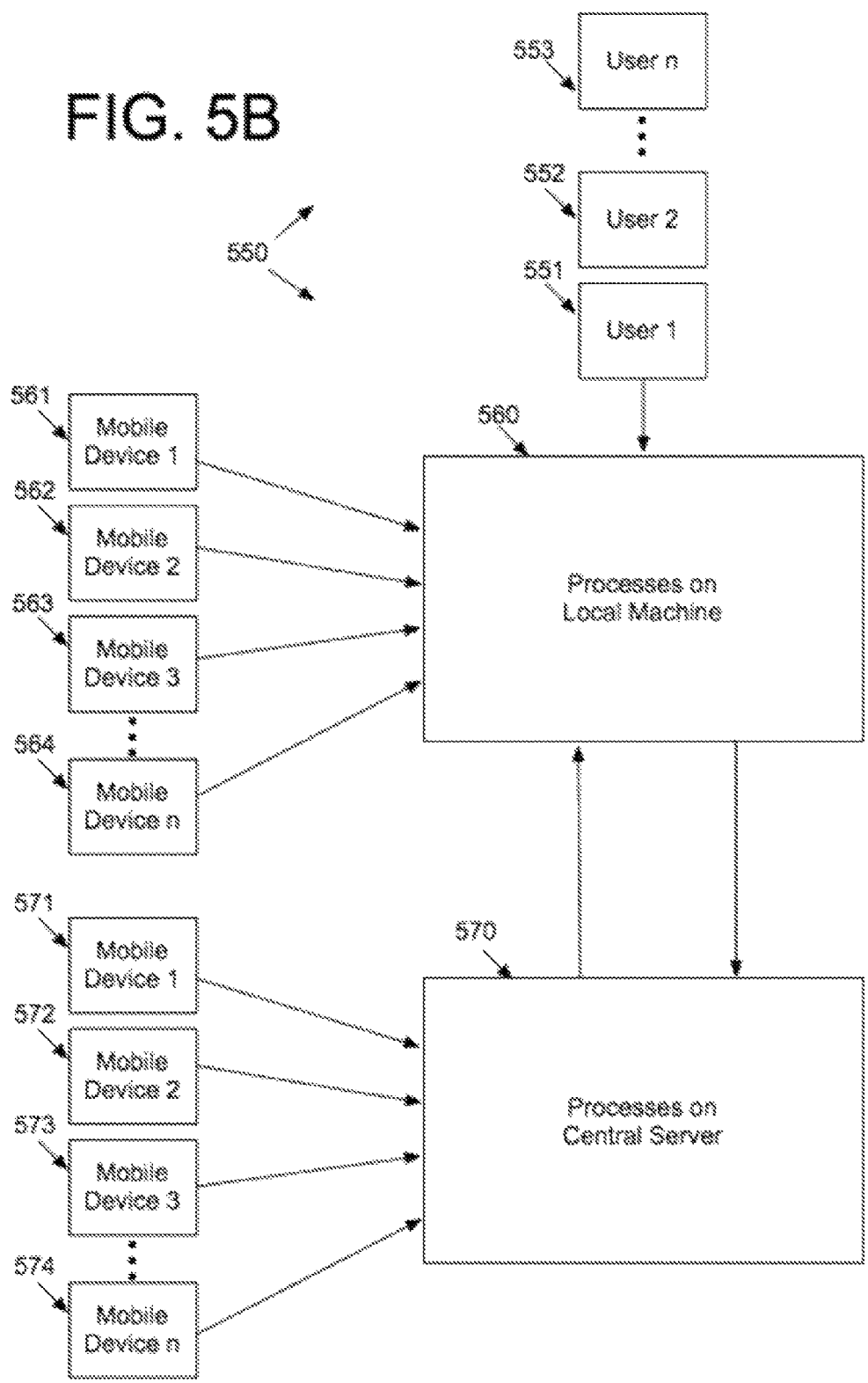
FIG. 5B is a block diagram denoting how multiple users can simultaneously interact with the same machine.

FIG. 5B illustrates how multiple users can simultaneously interact with a single machine either directly through the traditional interface on the machine or via a mobile device either directly communicating to a machine or via a centralized server that passes communications messages to the designated machine. A plurality of users 551, 552 up to any number of N users 553 can queue up in front of the vending machine in a traditional manner and interact with the processes on the machine 560 one at a time. A plurality of users 561, 562, 563 up to any number of N users 564 may also simultaneously interact directly with the processes on the machine 560 via a mobile device. (These methods of interaction are defined in FIG. 12). A plurality of users 571, 572, 573 up to any number of N users 574 may interact directly with the processes on a centralized server or collection of servers 570 via a mobile device. The centralized server(s) relay data and messages to the processes on a selected local machine 560. (These methods of interaction are defined in FIG. 11

Figure 6:
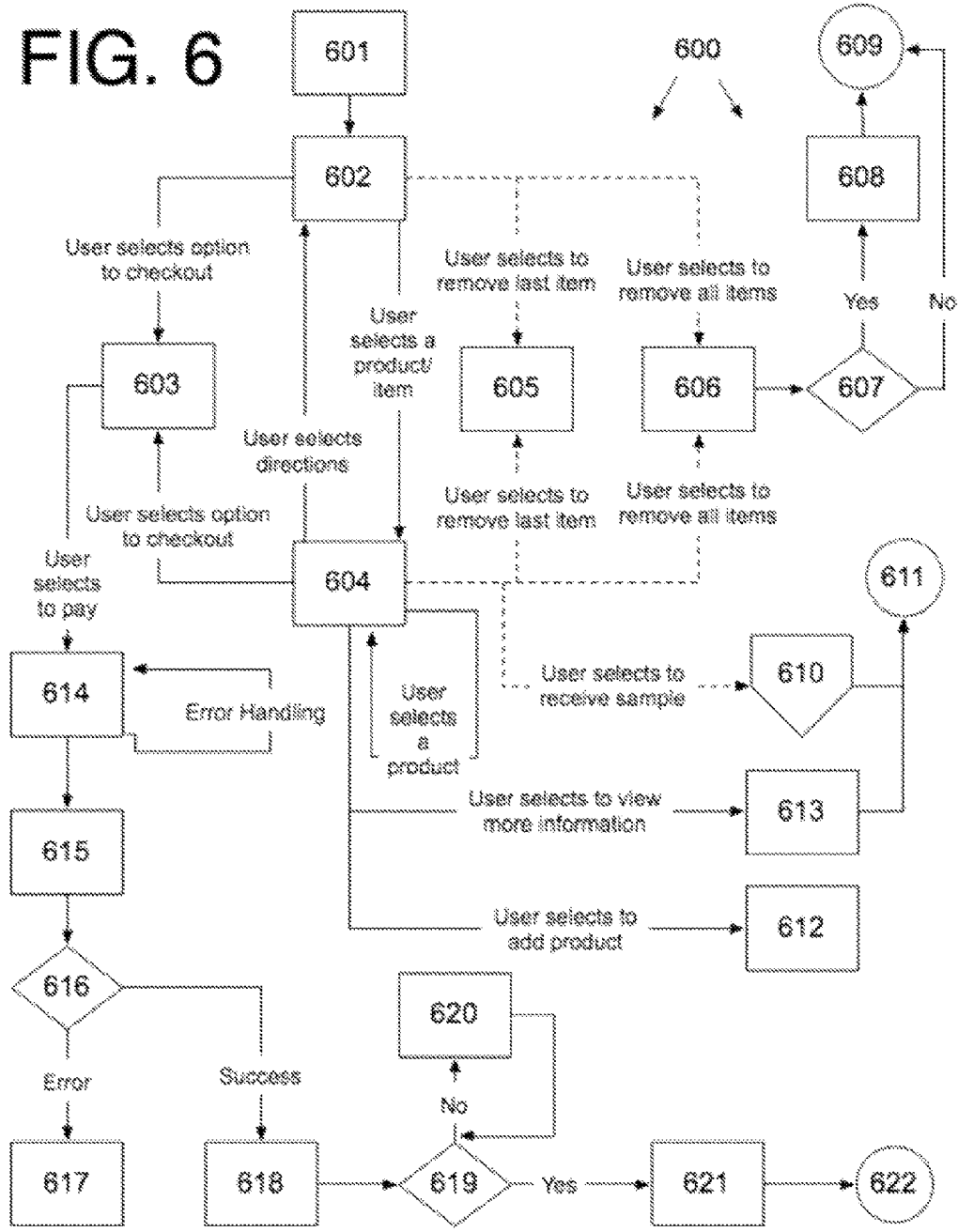
FIG. 6 is a software block diagram of a preferred visual selection process.

Turning to FIG. 6, the operation of one of the plurality of users 551, 552 or 553 interacting with the processes on the local machine 560 as shown in FIG. 5B is depicted FIG. 6. Subroutine 600 (FIG. 6) illustrates a preferred visual selection process on the local machine. Each step in the process is logged in a file recording the time, machine ID and session variable along with any user-selected data such as products chosen. The process begins when the user selects the visual selection user interface 601 on the touch screen (202; FIG. 2). The system can also be programmed to display this screen at startup or when a user touches the façade in cases where a touch display system is utilized. Again referencing the touch façade system, and as detailed in the above-mentioned application titled "Interactive and 3-D Multi-Sensor Touch Selection Interface For an Automated Retail Store, Vending Machine, Digital Sign, or Retail Display," Ser. No. 12/589,277, touching of the façade can be programmed to launch the visual selection interface. Actions conducted on the physical façade are replicated accordingly on the visual selection interface. A physical touch on the area in front of a product on the façade represents the same action as a selection on the same product represented on the touch screen visual interface.

Figure 8:
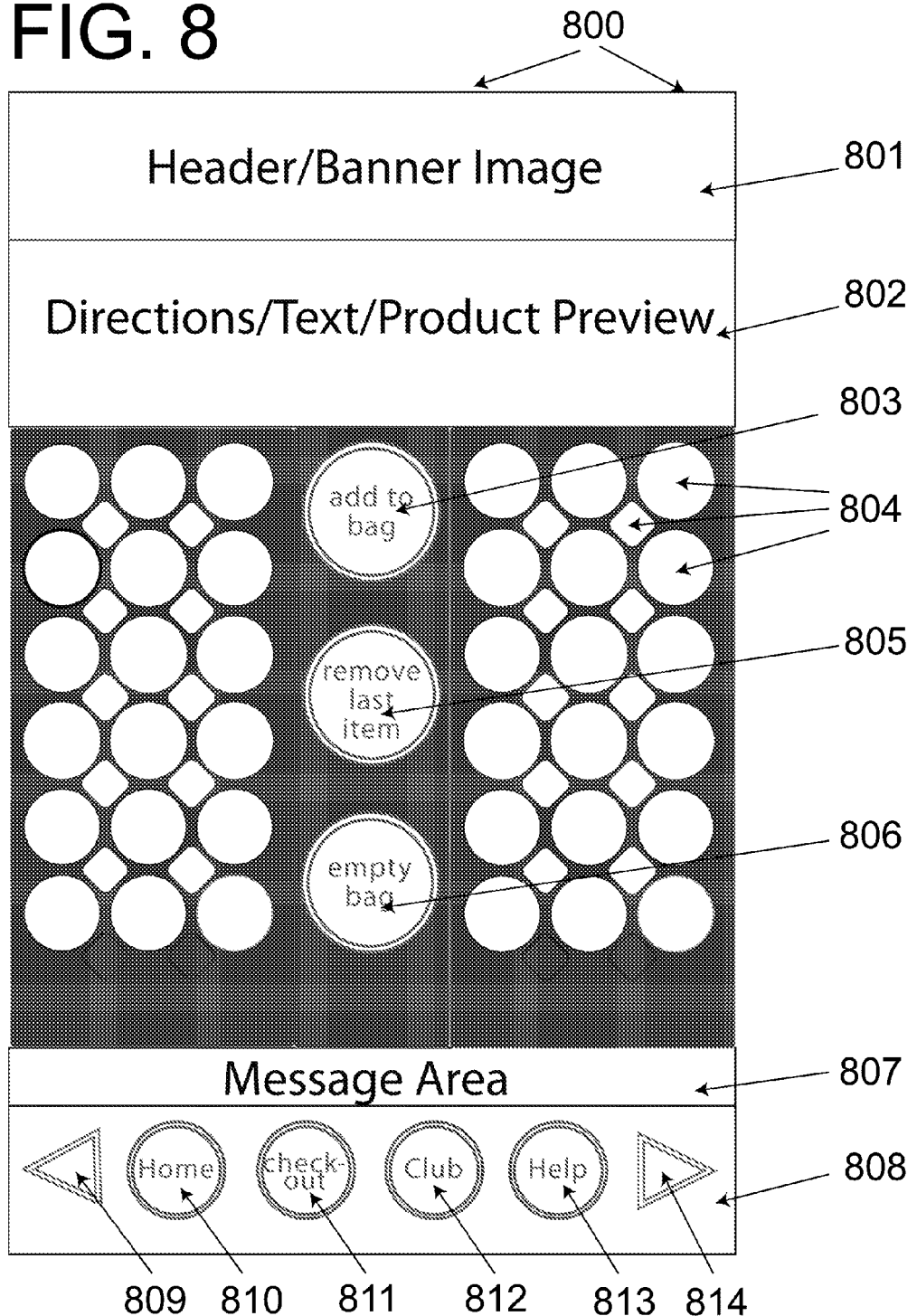
FIG. 8 is an example screen template for a preferred visual selection touch screen graphical user interface.

Once in the visual selection interface, the user is then presented the main visual selection screen 602. This is represented in FIG. 8 with the section 802 (FIG. 8) filled with directions and text on how to use the interface as detailed out by administrative personnel. This information resides on the machine as an Extensible Markup Language (XML) file where it is called by this process. From this screen, the user then has multiple options. Depending on the state of the application, some user options may be conditional on the user's state. These steps are denoted by the dotted lines connecting to steps 602 and 604. The user's state is determined by session variables that store various pieces of information about the user's actions for any given session. These are referenced each time the main visual screen interface 800 (FIG. 8) is displayed in step 602 and when the product preview form of this screen is displayed in step 604.

At any time, the user may select the checkout button 811 (FIG. 8) that will take them to step 603 that displays the virtual shopping bag screen. The virtual shopping bag screen will list out any items that the user added to their shopping bag, or shopping cart. The user may also select any product or item visually displayed in the visual selection interface depicted on the screen, taking them to step 604.

Step 604 displays a preview of the product/item selected in the designated area 802 (FIG. 8) of the graphical user interface. When the user selects an item by touching the virtual representation of it on the screen, step 604 uses the product identification number for the item to retrieve the preview description for that item. This information is stored in a database or a file folder structure as a combination of extensible markup language documents such as XML or XAML (Extensible Application Markup Language (XAML). The preview information is a subset of critical information that a user could consider crucial in making a purchase decision. This information may include but is not limited to the price, a brief description, and a larger image of the product. Each of these items is stored by the product identification number associated with the item that the user selected.

Step 604 also highlights the product in the virtual façade display by altering the background coloring of that item on the touch screen. This process also alters the lighting in the corresponding area that is associated with the selected product identification number in the physical display as detailed in the above mentioned application Ser. No. 12/589,164, entitled "Vending Machines With Lighting Interactivity And Item-Based Lighting Systems For Retail Display And Automated Retail Stores." The color, hue, saturation and intensity (lightness) of the physical light and the onscreen color highlighting are stored in an XML as defined in the aforementioned patent. These settings are configured by an authorized administrator before application runtime and dictate how the application responds to user input in the above scenario.

From step 604 the user may also select to add the product being previewed to their virtual shopping bag by selecting the one of add to bag buttons on the screen which will bring them to step 612. Step 612 adds the item to a software list in memory that represents the items in the virtual shopping bag and tracks the order in which it was added. This information is stored in local memory and associated with the current session identification number that was created at the start of the user's interaction with the machine. Step 612 also highlights the product in the virtual façade display by altering the background color of the item. In reference again to the aforementioned application Ser. No. 12/589,164, the lighting for the corresponding item associated with the selected product identification number in the physical display will alter as well. These lighting settings are also configured by an authorized administrator before application runtime and dictate how the application responds to user input in the above scenario. Any item added to the virtual shopping bag will remain highlighted as long as it is present in that virtual shopping bag. This coloring in the virtual façade and lighting in the physical façade provide an easy to understand visual cue as to what items the user has already selected.

From the main visual selection screen displayed in 602, the user also has the option to remove the last item they added to their virtual shopping bag. This option is conditional on whether the user has any items already in their virtual shopping bag and is represented by 805 (FIG. 8). The virtual shopping bag session variables are checked in step 602 as it loads the visual selection main screen 800 (FIG. 8). If they do not have any items in their virtual shopping bag, this selection is not available. If they did have at least one item to remove, they are taken to step 605 that removes the last item a user added. The item is removed by deleting the product identification number in the list of items stored in the session variable representing the virtual shopping bag in local memory. Control is then handed back to step 602 which rechecks the session variables to determine if the option is still available or not. The user may repeat this action until there are no more items left in the virtual shopping bag.

From step 602 that is displaying the main visual selection screen, the user may also select to remove all of the items they added to their virtual shopping bag taking the user to step 606. This option is also conditional upon the presence of items in the user's virtual shopping bag determined by the data stored in the session variable. Before step 602 displays the main visual selection screen, it checks the session variables and determines if this option is selectable or not. If the user has no items in their virtual shopping bag, the user may not select this button represented as 806 (FIG. 8). If step 602 determines this is a valid user option and the user selects this button, they are taken to step 606 where the user is prompted to confirm that they wish to remove all of the items in their virtual shopping bag. This action cannot be undone so the user is given a second chance to confirm the action. The process continues to step 607 that checks the user's response. If the user confirms they want to remove the items, the items are removed from the shopping bag in step 608. This step is similar to step 605 except that it clears all of the items in the shopping bag regardless of the number of different items or the quantity. All product identification numbers stored in the session variable list representing the virtual shopping bag in local memory are deleted. User control is returned by step 609 to the originating step (602 or 604) depending from which step the user selected to remove all items 606. Since the user may initiate step 606 from either step 602 or step 604, the application must keep track of the originating source by noting the current screen in its history session variable. When the control is returned, it forces a refresh of the screen by calling the step (602 or 604) to recheck the session variables determining which options are available to the user. If the user does not wish to delete all of the items in their virtual shopping bag, step 607 sends control to step 609 that directs user control back to the originating step (602 or 604) that called step 606.

Like step 602, step 604 also checks the session variables each time it loads to determine which options are available to the user. Like step 602, if the option is available, step 604 allows the user to go to step 605 to remove the last item the user added to their virtual shopping bag. Like step 602, step 604 also allows the user to remove all of the items in their virtual shopping bag in step 606 if the user had items present in their bag. Like step 602, in step 604 the user may also select to checkout and proceed to step 603. The user may also select another product or item in the virtual display. However, since step 604 is only reached by selecting an item, there are additional options available. The user may select to add the currently displayed product to their virtual shopping bag by selecting this button noted as 803 (FIG. 8). Selecting this button brings the user to step 612. Step 612 is a subprocess that adds the associated product identification number of the selected item to the list of items in the virtual shopping bag that is stored in a session variable. After the step 612 subprocess completes, control is handed back to step 604. Step 604 rechecks the session variables to determine if any of the conditional user options have changed availability and then refreshes the screen.

From step 604, the user can also select to display more product information taking them to step 613. Step 613 takes the user out of the visual selection mode into the main application that will bring the user to the main product display page for the selected item. The product identification number is passed to the application that uses it to retrieve additional stored information about that item. The user may return to the visual selection interface via step 611 by immediately selecting the back button 809 (FIG. 8) from the product display page or by selecting the visual selection button from the home screen which is reachable through the user navigation area located on every application screen and noted by 808 (FIG. 8). If a user returns the visual selection interface via the back button, the screen the user navigated away from is redisplayed. If the user returns to the visual selection interface through any other method, the session variables that store the visual selection interface's state are read in step 601 and the user returns to step 602. The state of visual selection process is retained as long as the user's session is active. Sessions will terminate if a specified amount of time has elapsed, the user selects to sign out of a session, or if a transaction completes, such as the purchasing of a product or products. If a session terminates, all session variables are deleted.

From step 604 the user may select to receive a sample of the product being previewed if a sample is available for the selected product. If one is not available, the option will not be shown to the user. The sample process 610 takes the user through a verification process to determine the eligibility of the user and also the dispensing of the sample. For purposes of vending machine software disclosure, this software algorithm was detailed in application Ser. No. 12/798,803, entitled "Customer Retention System and Process in a Vending Unit, Retail Display or Automated Retail Store," referenced above. After the sample process, the user may return to the visual selection interface via step 611 by selecting the back button 809 (FIG. 8) until they return to a visual selection screen or by selecting the visual selection button from the home screen which is reachable through the user navigation area located on every application screen and noted by 808 (FIG. 8). Upon reaching the visual selection screen, the session variables are rechecked and the screen is displayed according to the current state.

When the user wishes to purchase items they added to their virtual shopping bag, from either step 602 or step 604, they may select the checkout button 811 (FIG. 8) that will bring the user to step 603. Step 603 checks the virtual shopping bag session variables and presents the user with a list of items they added to their bag during their session. They may address the quantities of the items by pressing a marked onscreen button to add to the quantity or an alternative onscreen button to subtract from the quantity for each item listed in the shopping bag. When the user is satisfied with the products and the quantities they wish to purchase, they can select to pay for the product or they can cancel and return to the visual selection page. If they select to pay, they proceed to step 614 that collects the user's payment information and performs error checking When the payment method has been validated using an external payment authorization service, the physical dispensing process begins in step 615. Step 616 monitors the dispensing. If there was an error, a message is displayed to the user in step 617. This step can also reverse any payment transactions if necessary along with initiating any system processes needed to return the machine to a functional state and notify service and maintenance personnel as necessary.

If the vending process worked correctly, the process continues to step 618 where the exterior door to the collection area is opened and the user is prompted to collect their purchase. A sensor in the collection area monitors the space to detect when a user retrieves their product. Step 619 monitors these sensors. If a preset amount of time elapses and the machine does not detect that the user has retrieved their product, the process proceeds to step 620 and the user is re-prompted to retrieve their purchase. This prompting may take the form of written messages on the screen, animations and videos indicating where and how to pick up their product. Audio and lighting cues may complement the aforementioned. When the machine detects that the vended merchandise has been retrieved, the process continues to step 621 where a message is displayed thanking the user. This process also closes the exterior door to secure the collection area. It initiates system processes that reset the mechanical components to their ready state. It also terminates the session removing any state variables of the visual selection process. This includes but is not limited to items that were selected and the history of actions taken during the session. After this is complete, the process ends in step 622.

Figure 7:
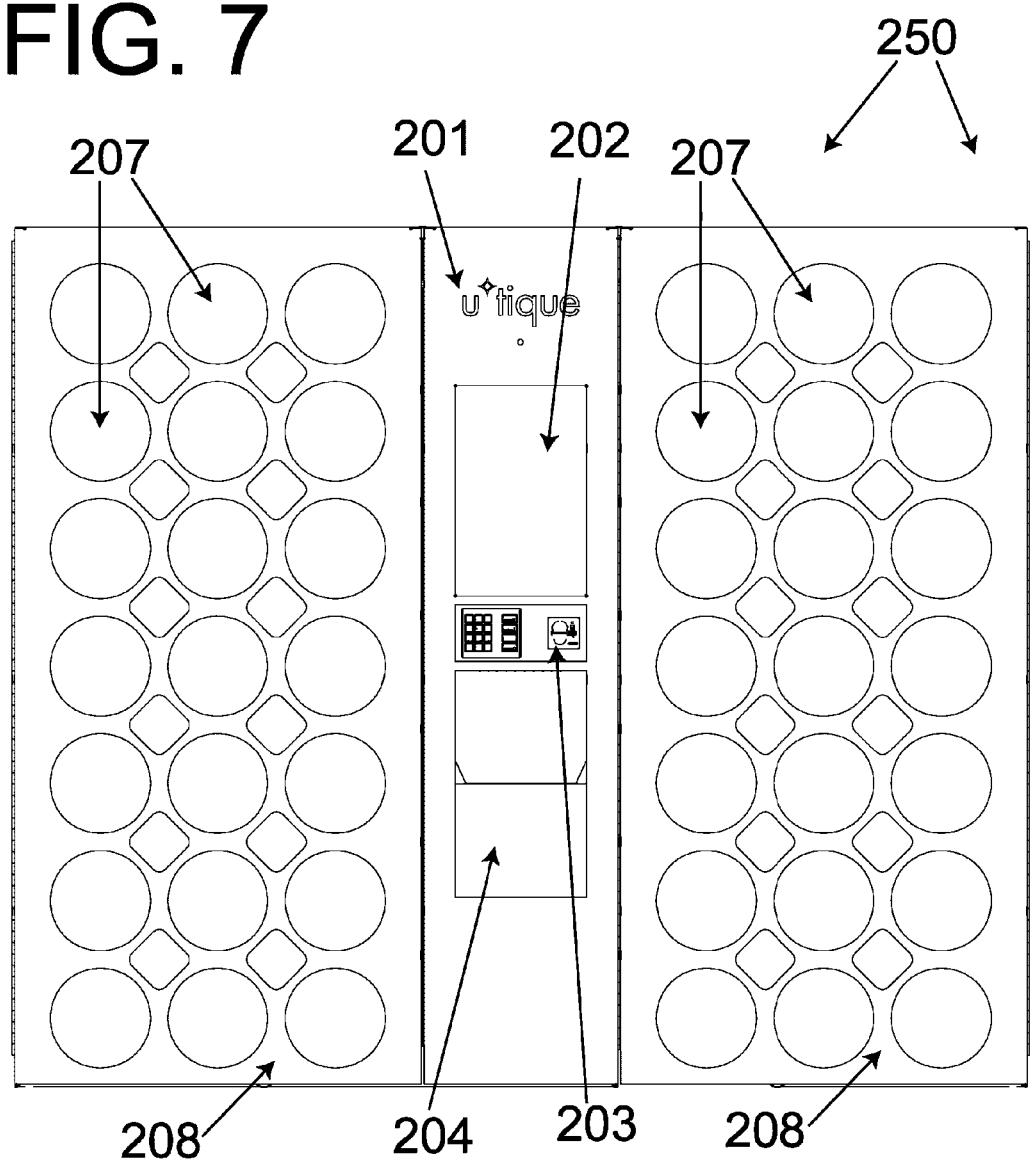
FIG. 7 is a front elevation view of an assembled vending machine module.

FIG. 7 shows a front elevation of another configuration of an automated retail vending machine 250, similar to that illustrated in FIG. 2. This machine is structurally similar to the one depicted in FIG. 2 with the difference of having two façade doors with a different display configuration. Like components, however, are employed, and they are denoted with the same reference numerals as illustrated in FIG. 2 and discussed in the corresponding text.

FIG. 8 shows an example of a graphical user interface 800 that corresponds to the machine 250 depicted in FIG. 7. This format may vary depending on the target screen size, e.g, the screen size of the local machine display or the screen size of the target mobile device, but will always portray a graphical representation of the physical machine it is emulating. Region 801 is reserved for a header or banner, comprising either a logo, title or screen directions. The area can be configured to display images, rich text or a combination of both. Area 802 is area reserved for additional text, directions, notifications, messages and the product preview area as referenced in step 604 (FIG. 6). Virtual selection button 803 allows a user to add the product being previewed to their virtual shopping bag as in step 612 (FIG. 6). It is only active and selectable if a product is currently being previewed. Displays 804 mimic the physical façade/display illustrated in FIG. 7 (i.e., showing the display tubes). This is an image of the physical façade overlaid with a list of coordinates relating to the image (or image map) to define the product areas. The image can be created from the engineering façade drawings and uploaded on to a machine by an administrative user during the machine's initial configuration. The image map uses the façade map file to determine which products appear in which positions. The façade map file is the same file used by the lighting system referenced in application Ser. No. 12/589,164. Administrative users of the system can change the arrangement of the products in the virtual façade by updating the image map and façade map file without changing the program code. The new files are read it at runtime and the screen is rendered accordingly. Each one of these displays 804 defined by the image map can contain an image or virtual representation of the physical product on display in the machine 250 in FIG. 7. These display areas 804 are selectable. When a user selects one of these display areas 804, the product preview area 802 is populated with additional information for that designated product and the color of the display area 804 is changed as defined in step 604 (FIG. 6).

Virtual selection button 805 enables the user to remove the last item they added to the bag. This process is defined as step 605 (FIG. 6). Virtual selection button 806 allows a user to remove all of the items in their virtual shopping bag. This process and its restrictions are defined in step 606 (FIG. 6). 807 is an area that can be used to provide the user with additional messages, notifications or advertisements.

Area 808 is the navigation area. It is comprised of a number of selectable buttons that the user may use to navigate the application. Virtual selection button 809 provides a "back" function, allowing the user to return to the previous screen they were viewing. Virtual selection button 810 provides a "Home" function, allowing the user to return to the Home screen define by step 601 (FIG. 6). Virtual selection button 811 is the "checkout" button. It is defined in step 603 (FIG. 6). Virtual selection button 812 is a selectable button that takes the user into the Club program as detailed in application Ser No. 12,798,803, entitled "Customer Retention System and Process in a Vending Unit, Retail Display or Automated Retail Store," filed Apr. 12, 2010, as referenced above.

Virtual selection button 813 takes the user to a help screen that provides additional information about using the application. Virtual selection button 814 is a "forward" button that takes the user to a screen they already viewed if the previously selected the "back" button 809 which took them back into their history. It is not active or selectable if the user is viewing the last page in their user history sequence.

Figure 9:
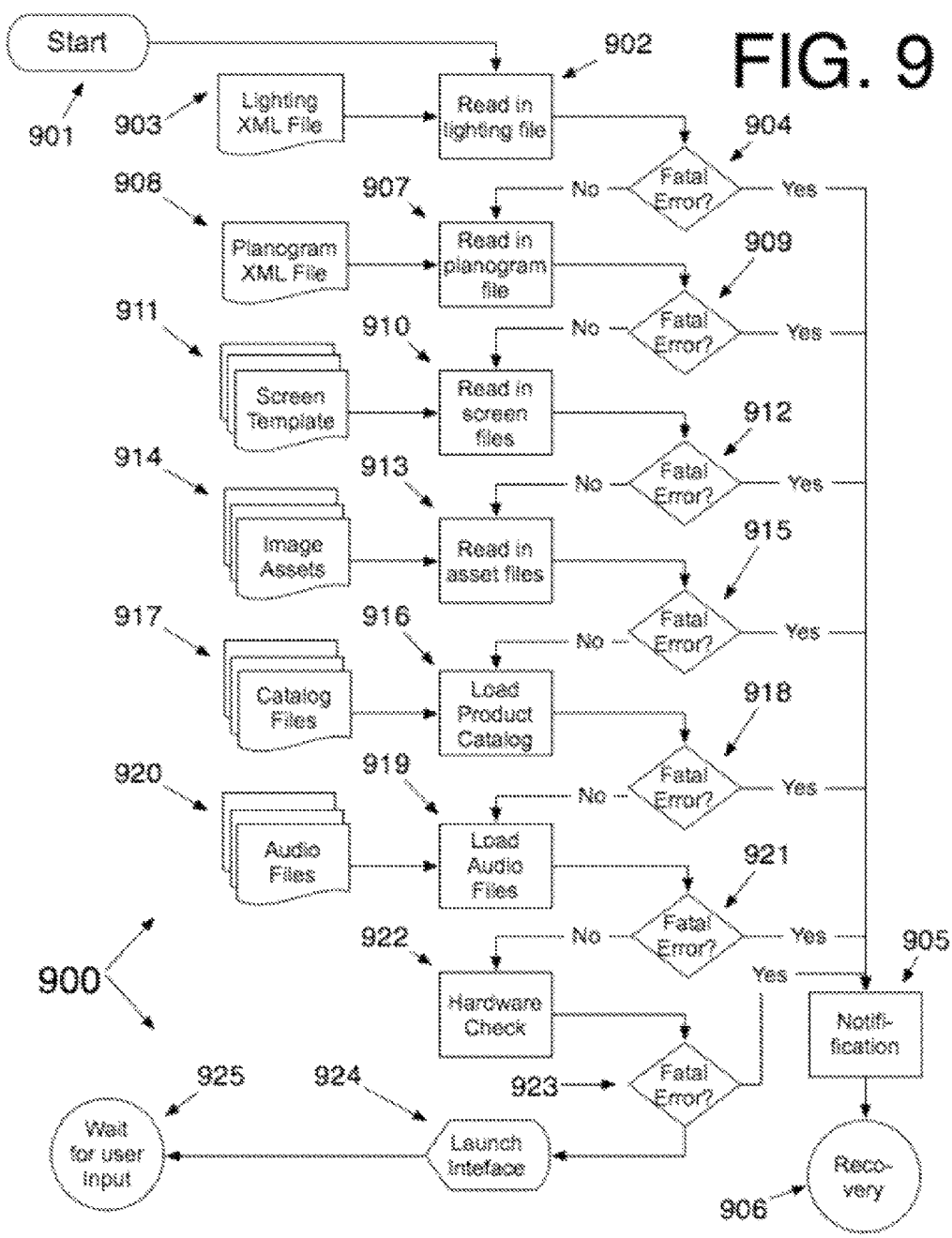
FIG. 9 is a software block diagram of a preferred visual selection runtime initialization process; and, FIG. 10 is a software block diagram of a preferred visual selection screen rendering process.

Subroutine 900 (FIG. 9) illustrates the preferred method of initializing the visual selection system at system runtime. The process begins at step 901 when the system application is launched. Step 902 reads in and parses the lighting XML file 903. The lighting file contains a sequence of lighting sequences to be performed for various user actions on the system such as selecting a product, adding to the virtual shopping bag and removing it from the shopping bag. These lighting sequences dictate both the onscreen coloring of products in the virtual display and the lighting of products in the physical display. These values are cached in local memory as an application variable. Step 904 checks if there are any fatal errors. Fatal errors are ones that prevent the system from allowing a user to complete a transaction. All errors are logged using the reporting and logging system 103 (FIG. 1). Non-fatal errors are noted in the log file so they can be examined later to correct the issue. If the error is fatal, the process goes to step 905 that sends out an alert notification to the notification system 103 (FIG. 1). The system will attempt to recover in step 906 by attempting to start the process again and reinitialize the system. If there are no fatal errors, the process continues to step 907 that reads in and parses the planogram file 908. The planogram file contains the product identification number, or item identification number, a product name and a Boolean value if it is active or not for each display slot number. These values are cached in local memory as an application variable. Step 909 checks if there are any fatal errors. If there are fatal errors, it routes to step 905, otherwise the process continues at step 910. Step 910 reads in all of the screen templates 911 such as 800 (FIG. 8) that determines the layout of the visual selection interface. Step 912 checks if there are any fatal errors. If there are fatal errors, it routes to step 905, otherwise the process continues at step 913. Step 913 reads in all of the screen asset files 914 associated with the screen templates 911. These asset files can be images or extended markup files that represent buttons such as 803, 805, 806, 809, 810, 811, 812, 813, and 814 (FIG. 8), header banners graphics that fit into header areas such as 801 (FIG. 8), directions or instructions that are displayed in designated areas such as 802, 807 (FIG. 8), image map files that determine which area on an image corresponds represents which area on the physical faade or images representing the physical façade such as 804 (FIG. 8). These assets are cached into local memory in the application. Step 915 checks if there are any fatal errors. If there are fatal errors, it routes to step 905, otherwise the process continues at step 916. Step 916 reads and parses the product catalog files 917. The product catalog stores all of information, graphics, specifications, prices and rich media elements (e.g. video, audio, etc.) for each item or product in the system. Each element is organized according to its identification number. These elements can be stored in a database or organized in a file folder system. These items are cached in application memory. Step 918 checks if there are any fatal errors. If there are fatal errors, it routes to step 905, otherwise the process continues at step 919. Step 919 reads in all of the system audio files 920 and the file that the stores the actions with which each audio file is associated. Audio files can be of any format, compressed or uncompressed such as WAV, AIFF, MPEG, etc. An XML file stores the name of the application event and the sound file name and location. Step 921 checks if there are any fatal errors. If there are fatal errors, it routes to step 905, otherwise the process continues at step 922. Step 922 does a system wide hardware check by communicating with the system peripherals and controllers 102 and 108 (FIG. 1). Step 923 checks if there are any fatal errors. If there are fatal errors, it routes to step 905, otherwise the process continues at step 924. Step 924 launches the application display on the touch screen interface. The system then waits for user input 925.

Figure 10:
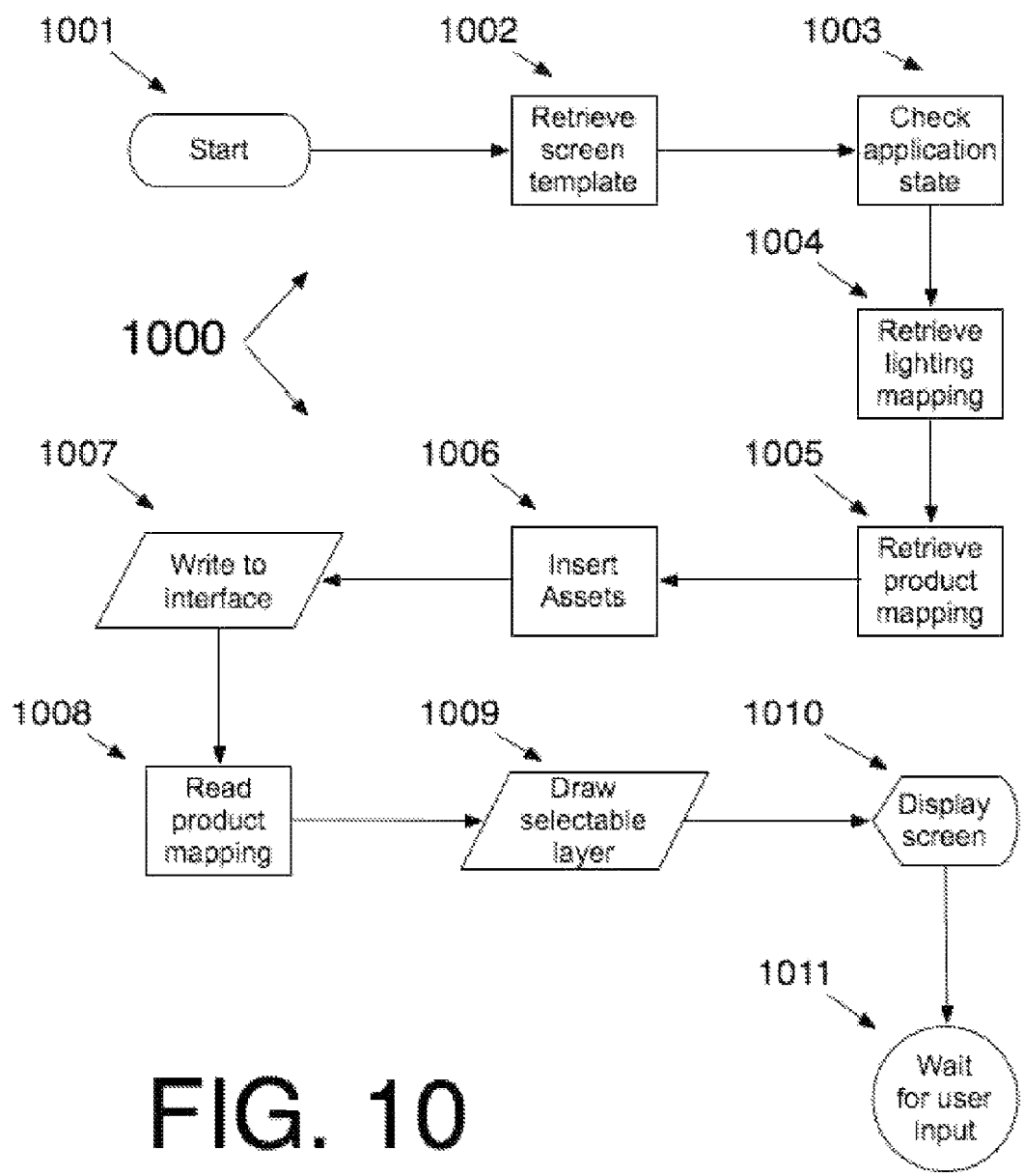

Subroutine 1000 (FIG. 10) illustrates the preferred method of rendering a selectable virtual visual selection merchandising interface. The process begins at step 1001 when a user makes a selection that brings them to the visual selection interface as defined by subroutine 600 (FIG. 6). Step 1002 retrieves the screen template 800 (FIG. 8). Step 1003 checks the application state by reading the session variables. These session variables are used to determine which assets go in which template areas, which items to display and which options are selectable by the user. Step 1004 retrieves the lighting mapping data out of the application memory. Step 1005 retrieves the product mapping data out of the application memory.

This data is used in conjunction with the application state and the lighting data to determine the coloring of the virtual display areas 804 (FIG. 8). If an action is performed by the user that has a lighting effect defined, the lighting data stored as series RGB (Red, Green, Blue) plus intensity values with transition times to indicate the amount of time to fade between color and intensity values. Step 1006 pulls the rest of the assets such as button and product catalog images out of memory. Step 1007 writes the data to the interface using the product mapping data retrieved in step 1005 and the image map file retrieved in step 1006 to determine the placement of each item on the virtual display. Step 1008 reads the product mapping and image map again to draw a selectable layer on the user interface in front of the rendered screen in step 1009. This provides the user with the interface that allows them to touch the virtual representation of an item or product and link it to an action that selects the product by calling a routine and passing in that product identification number to the application as defined in process 600 (FIG. 6). Step 1010 renders the information on the touch screen presenting it to the user. The system then waits for the user's input in step 1011.

As depicted in FIG. 5B, a plurality of users 571, 572, 573 and 574 can actively choose to interface with a machine by initiating communication directly with the machine or to the machine through the central server in a variety of ways using a mobile device. In each method, a user identifies themselves with a unit by sending a message with their mobile number, mobile MAC address, user name, machine name or other identifying name that allows the machine to send a response back to the mobile device making the inquiry. There are multiple ways for a user to actively communicate with a machine to accommodate for the variances in mobile device capabilities.

One method of communication utilizes sending messages to a centralized server that is synchronized with data from the local machine. This can be done either through a cellular network by utilizing SMS and MMS on a mobile carrier's network or through a cellular service's data network. Messages may contain data about the machine or about an individual product, service or promotion associated with the local machine. To account for user preferences and various mobile capabilities, users may read, input and send identifiers that link to additional information in a variety of ways.

One method allows users to read labels on the machine that are linked to an item, promotion or machine. Labels can take the form of human readable alphanumeric characters that a user can input into their mobile device through any input device such as 10-key, touch screen or keyboard. They can also take the form of matrix codes, two-dimensional bar codes that a user can input into their mobile device by capturing the image through a camera function that is translated by software to extract the identifier and additional information encoded into the bar code.

For mobile devices with sensor reading capabilities, information can be directly communicated with the mobile device (examples of sensors include RFID, or infrared). A mobile device can read this sensor within the specified proximity. Once a user has an informational identifier, they can transmit this data to a machine or system where the informational identifier can be used to look up additional information and media. This can be done via software installed on a mobile device, through a mobile web site, or via a cellular network using standard cellular protocols.

Users can use any mobile device capable of sending SMS (text messages) or MMS (multimedia messages) to communicate with a machine via the centralized server to which the machine is connected. SMS messages can contain text of any identification sequence labeled on the machine. MMS messages can contain pictures taken of matrix codes or physical products in the machine. These messages are routed through the user's local carrier to a server that receives the message. The message is parsed to determine the sender's number and any additional information that was sent. If the user's mobile number is associated with a registered member account, additional benefits such as discounts, promotions and specials may be applied in addition to whatever other information that is being requested. Information that may be sent in a message includes machine identification number that is listed on the machine, product information number, picture of matrix code (two dimensional barcode), or promotional offer identification number or picture. The central server determines the codes sent by parsing them and pattern matching them to items and information stored in a data store such as database or file system. Codes are unique to a data item and follow a formatting scheme that allows them to be quickly parsed and processed.

Users with data service on their mobile devices can also use a mobile website to communicate with a machine. The mobile website provides browser-based access to a dedicated web application using a mobile device—such as a smartphone—connected to a wireless network. The mobile website allows a user to input information such as a machine identification number that is listed on the machine, product information number, picture of matrix code (two dimensional barcode), or promotional offer identification number or picture.

Alternatively, users with a data service on their mobile devices may run a mobile software application built for their mobile operating system that facilitates the communication between the mobile device and the machine or central server.

For the mobile website and mobile applications, merchandise data for a machine or retail display can be sent to that phone from the server or directly from the machine. This merchandise data, organized into a virtual planogram, can be used to virtually represent the physical display of the local machine. Users can then select the product, service or promotion that they are interested in by using the touch sensor capabilities of the mobile device and selecting the virtual image of the product. The process of selection is made more intuitive and efficient by providing physical delineation, or framing, between merchandise in the physical display design. The virtual display representation mimics the framing in the physical design. Information about the merchandise selection is rendered on the mobile device.

Figure 11:
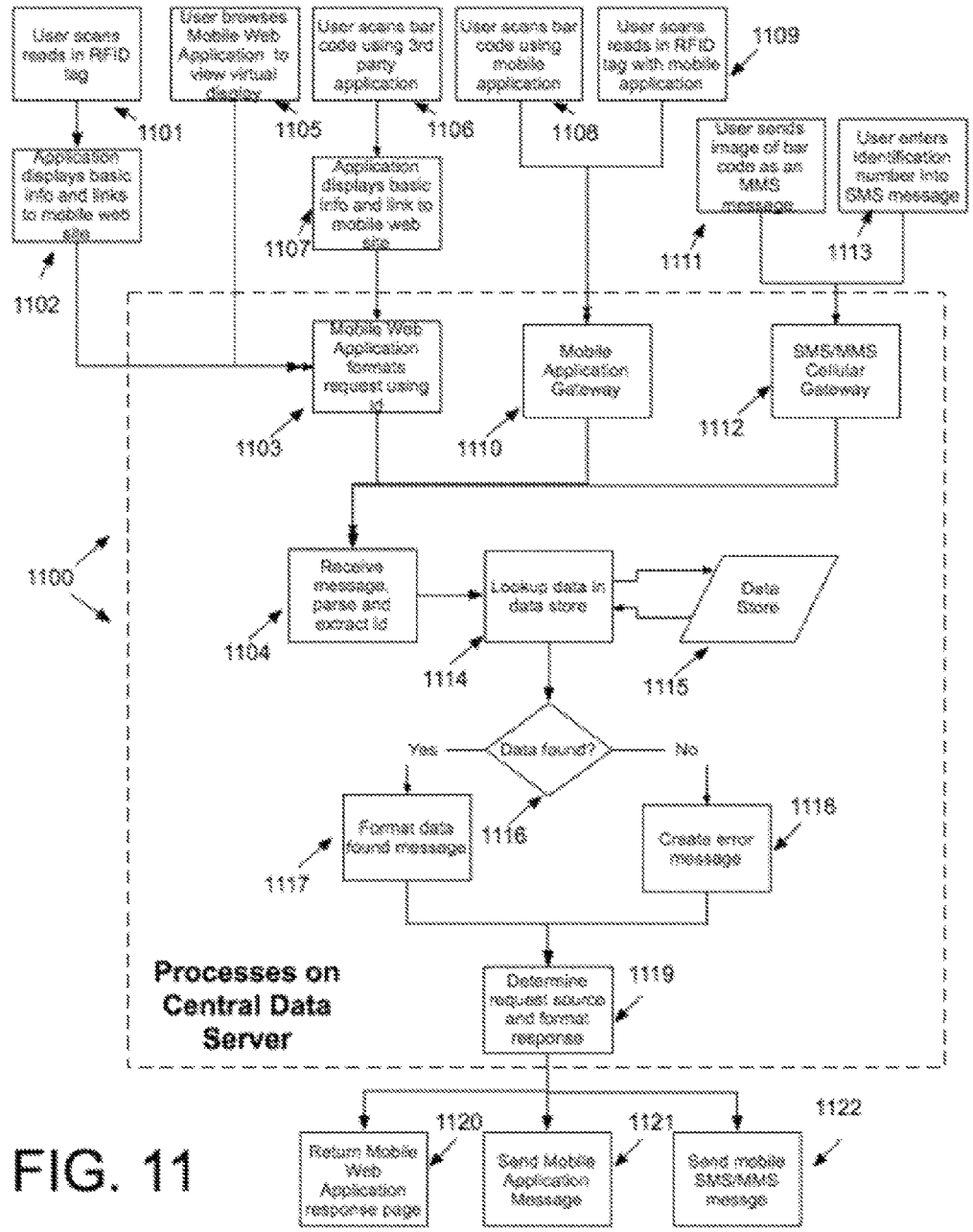
FIG. 11 is a software block diagram of a preferred "active communication process (via mobile app, WAP web or SMS/MMS)"
Figure 12:
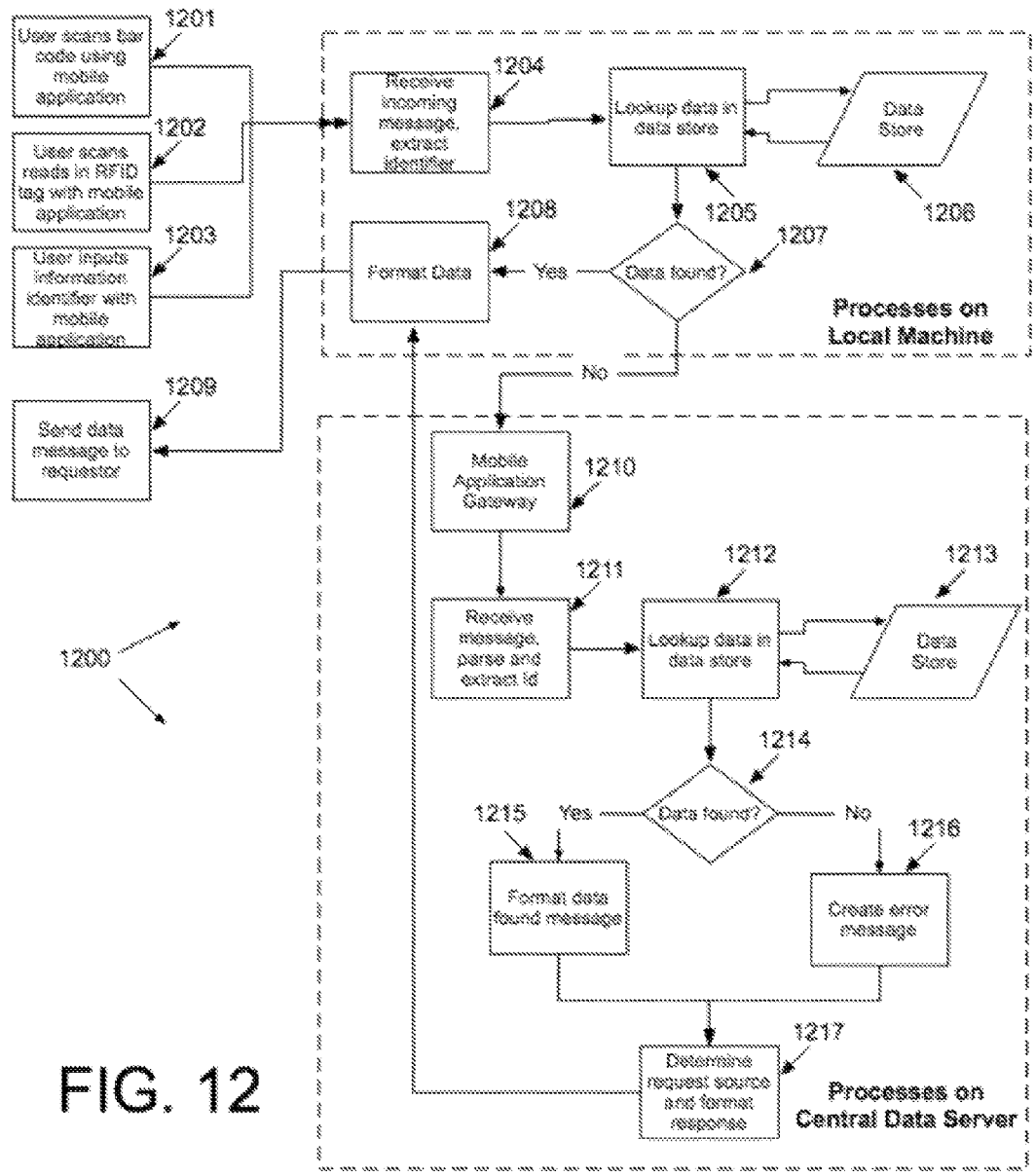
FIG. 12 is a software block diagram of a preferred "direct active communication process (via WiFi or Bluetooth)".

Turning to FIG. 11, subroutine 1100 illustrates a preferred method of looking up information on a central server with a mobile device using a mobile device's cellular or wireless data capabilities. The process can be initiated in any number of ways depending on the user's preference. In step 1101, a user utilizes RFID reading capabilities of their mobile device. Reading an RFID tag associated with a machine or displayed product extracts the id number that can be used to lookup and retrieve additional information such as product, store or promotional information. In step 1102 the user can input this information into a mobile web application at step 1103. Step 1103 formats the information request and sends to the server in step 1104 where the request is received, parsed and the identification number is extracted.

Alternatively, the user can initiate the process by using the mobile web browsing capabilities in their phone to peruse the mobile web application to make a selection corresponding to the information they wish to retrieve. This selection can be made by scanning an RFID tag at step 1101, via a virtual representation of the façade of the machine at step 1105 or by uploading an image of a matrix code at steps 1106 and 1107 that can be processed by the mobile application in step 1103 to extract the information identifier. At step 1105 the user may browse a mobile web application that displays the XML planogram of the façade display to select a product. The planogram is stored as an XML dataset and uses a series of corresponding images to display. For mobile devices with a locally stored mobile application and mobile devices that support mobile web browsing functions, a virtual representation of the physical façade of a local machine may be displayed on the mobile device. This step uses the process outlined here to send the initial request for the required information necessary to display that virtual façade which includes a data map of product identifiers and location and all of the associated images. With the initial request to display the virtual façade, an identifying piece of information is sent with the request to identify which virtual façade to display. This identifying information can be GPS coordinates, a physical address or even a store number. This information is used to lookup the nearest machine that most closely matches the request and responds to the request with the proper XML file and associated images required to display the virtual display on the mobile device. Once a machine is matched to the input provided by the mobile device, the planogram and virtual interface (FIG. 8) is returned to the mobile device. For mobile applications, an XML file containing the map of products and associated product images is returned and the mobile application renders this as defined in FIG. 10. For mobile web browsing, the rendering is performed on the central server and the mobile web formatted page is returned to the user. When a user clicks/touches/selects a product on the virtual facade, a product ID is sent to the server in step 1104 which interprets the request.

A user may also use a third party code scanning application on their mobile device to read a matrix code 1106 associated with a machine or displayed product. The matrix code contains the identifier and some basic information which is displayed in step 1107 and a Uniform Resource Locater (URL) that directs a user to a mobile web application that the user can access through their mobile device's web browsing application 1103. Users may also use a mobile application installed on their mobile device 1108 that utilizes a built in image capturing device such as a camera to read and process a matrix code and display that stored information on their device. They may also use a mobile application installed in their device to read in an RFID tag if their device has that capability or enter that identifier in manually through the interface in step 1109. All mobile application requests are handled via a mobile application gateway 1110. Users may also use their cellular carrier's MMS and SMS services to communicate with the system. In step 1111, users may use a built in camera in their mobile device and an MMS service to send a picture of a matrix code associated with a machine or displayed product to the system's MMS/SMS cellular gateway 1112. They may also send a SMS text message with information identifying a machine or displayed product in step 1113 to the MMS/SMS gateway 1112. The gateway handles all MMS and SMS messages sent via any carrier which are then routed to the system servers. The gateways can be housed internally or outsourced to one of many SMS Gateway providers that operate as a service.

All gateways send their information request to incoming server process 1104 that receives and parses the message, notes the incoming source and extracts the information identifier that is used to look up the requested information. Step 1114 uses the identifier to lookup the associated information in the data storage 1115. The data storage may be a database or file storage system that stores any information that may be requested by a user such as product information, brand information, store or machine information or promotional information. Step 1116 checks whether the requested data was found. If the data was found, step 1117 formats the information retrieved based on the requesting source. If no data was found, step 1118 formats an error messaged based on the requesting source. Step 1119 uses the request source to route the response back to the appropriate place. Step 1120 handles requests directed towards the mobile web application. Step 1121 handles responses made from mobile applications. Step 1122 handles all messages received through the MMS/SMS Gateway.

Subroutine 1200 (FIG. 12) illustrates the preferred method of looking up information by directly connecting to a machine or enabled display with a mobile device using a mobile device's wireless data capabilities such as WLAN or Bluetooth. The process can begin in a number of ways depending on how the user initiates it. A user may scan a bar code using a mobile application in step 1201 and send directly to a local machine over a wireless connection to a local application on the unit. Step 1204 receives the incoming message and interprets the message extracting any identifiers captured in the previous step. The user may also read an RFID on their mobile device at step 1202 and send that information to the local application on the unit. The user may alternatively use the mobile application installed on their phone to enter a text identifier that identifies the information they wish to access at step 1203. Each of these user inputs are read in step 1204 where the incoming message is received and parsed. The information identifier is extracted and used in step 1205 to form a query to lookup the requested information from a data store 1206. This data store 1206 is synchronized with a central storage location. Step 1207 tests the result of the query. If a record was found, the data is formatted and sent in step 1208 to the user's mobile device where the installed mobile application translates the returning message and displays on the user's mobile device screen.

If step 1207 determined that no associated information was found locally, the local unit application makes a request to the central system. This message is received by the mobile application gateway in step 1210 and routed to step 1211 which parse the message and extracts the information identifier. This identifier is used in step 1212 that formats a data query and queries the data store 1213. The information returned by the data store is evaluated in step 1214. If the requested information was found, step 1215 formats the data into a message to be sent back to the user. If no data was found, step 1216 creates an error message to send back to the user. Step 1217 formats the message and uses the requestor source to properly route the message back to the unit that relayed the request made by the user where it is received in step 1208 and routed to the mobile device of the user 1209 where it is displayed on the user's mobile device interface.

Figure 13:
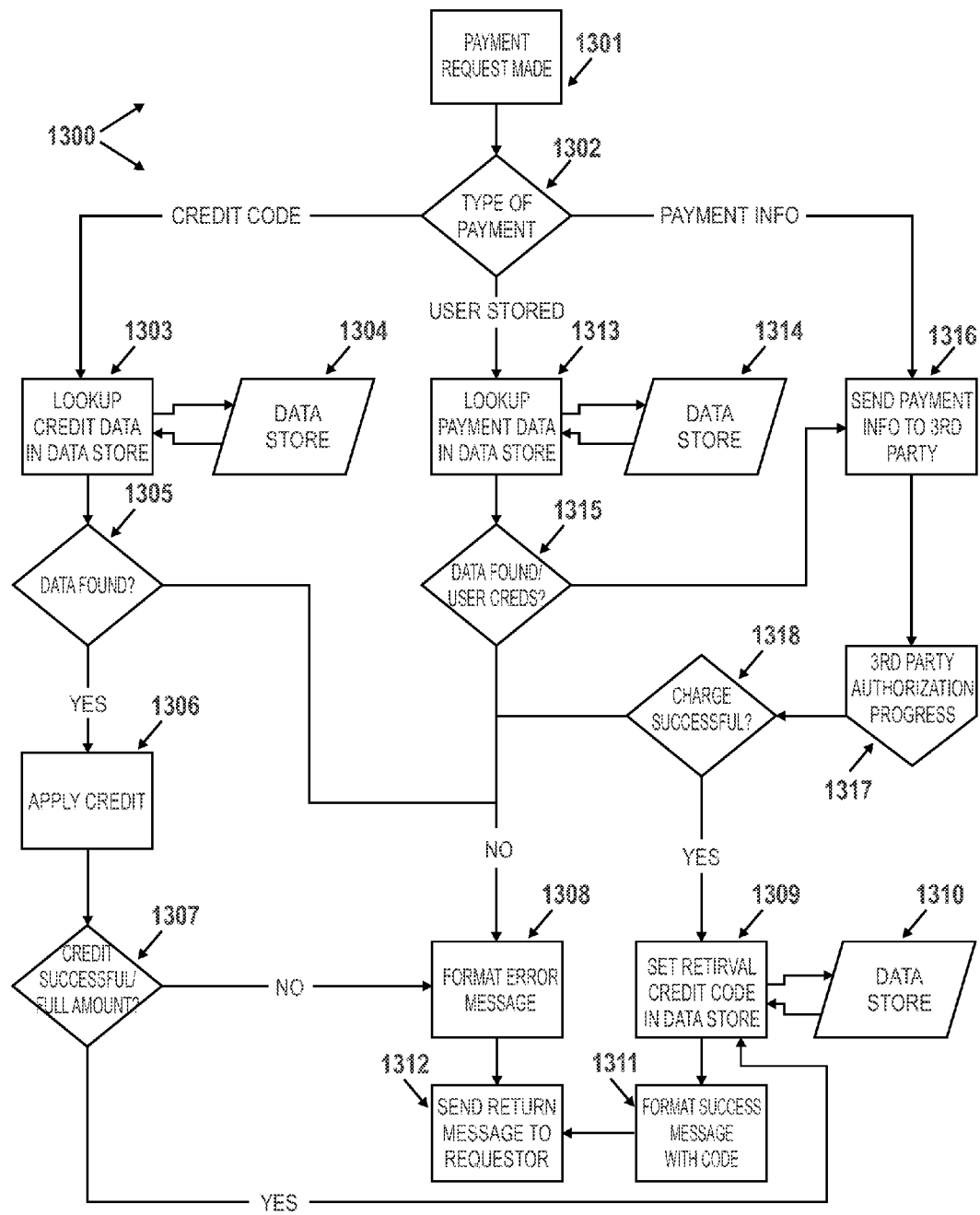
FIG. 13 is a software block diagram of a preferred "field communication process."

The purchase subroutine 1300 (FIG. 13) begins when a payment request is made by a user on a mobile device 1301. The purchase subroutine resides inside the central server application and can be accessed by the connected website, mobile website, mobile application or any other authorized program with the proper credentials. This subroutine assumes that a purchase request cannot be made if a product is out of stock. Step 1302 receives the request for the product and the machine and determines what type of payment is being supplied. If the user is using a credit code to pay for a purchase, the supplied code is put into a query in step 1303 and the data store for credit and promotional codes 1304 is accessed to retrieve information. Step 1305 tests to determine if the code was valid and successfully retrieved. If it was, the credit is applied to the balance in step 1306. Step 1307 checks to see if the credit successfully covered the cost of the purchase, if not a message is formed in 1308 that a residual amount is owed through another payment method. If 1307 determines the credit application was successful, step 1309 forms a query to update credit code in the data store 1310 and set a retrieval code that the user will enter into the machine to retrieve their product. The process then continues to step 1311 that formats a success message with the retrieval code. Step 1312 sends the return message to the user that initiated the payment request.

If step 1302 determines that a payment request is being made that will use stored payment data from a registered user, the process proceeds to step 1313. Payment requests using stored registered user data will contain the necessary credentials to verify the user. These are used in step 1313 to form a query to the data store 1314 that uses the query to find the user stored payment information. The data is evaluated in step 1315 to ensure the user making the request had the proper credentials and the complete payment data was found. If the credentials or the payment data was not found, the process continues to step 1308 where an error message is formed and then sent in step 1312. If step 1315 determines that the user's credentials are valid and there is associated payment account information retrieved, the subroutine proceeds to step 1316 where the payment information is sent to a third party payment gateway service 1317. This is a separate entity and process that handles payment authorizations. Examples can be a payment processor such as, e.g., First Data or PayPal, services that facilitate payments and money transfers to be made through the Internet or Authorize.net, a payment gateway that handles a variety of credit card authorization services. These services return a code or series of codes that conveys whether the payment was successful or not. In unsuccessful cases, the process will return error codes that can be translated and returned to the user. Step 1318 receives the message and determines if the payment was successful. If the payment was not successful, step 1308 formats and error message using the error codes returned from step 1317. If the payment was successful, step 1309 creates a retrieval code and stores that in the data store 1310. Step 1311 formats a success message with the retrieval code that the user will enter in a unit to retrieve their purchase. Step 1312 sends that message back to the user making the payment request.

Figure 14:
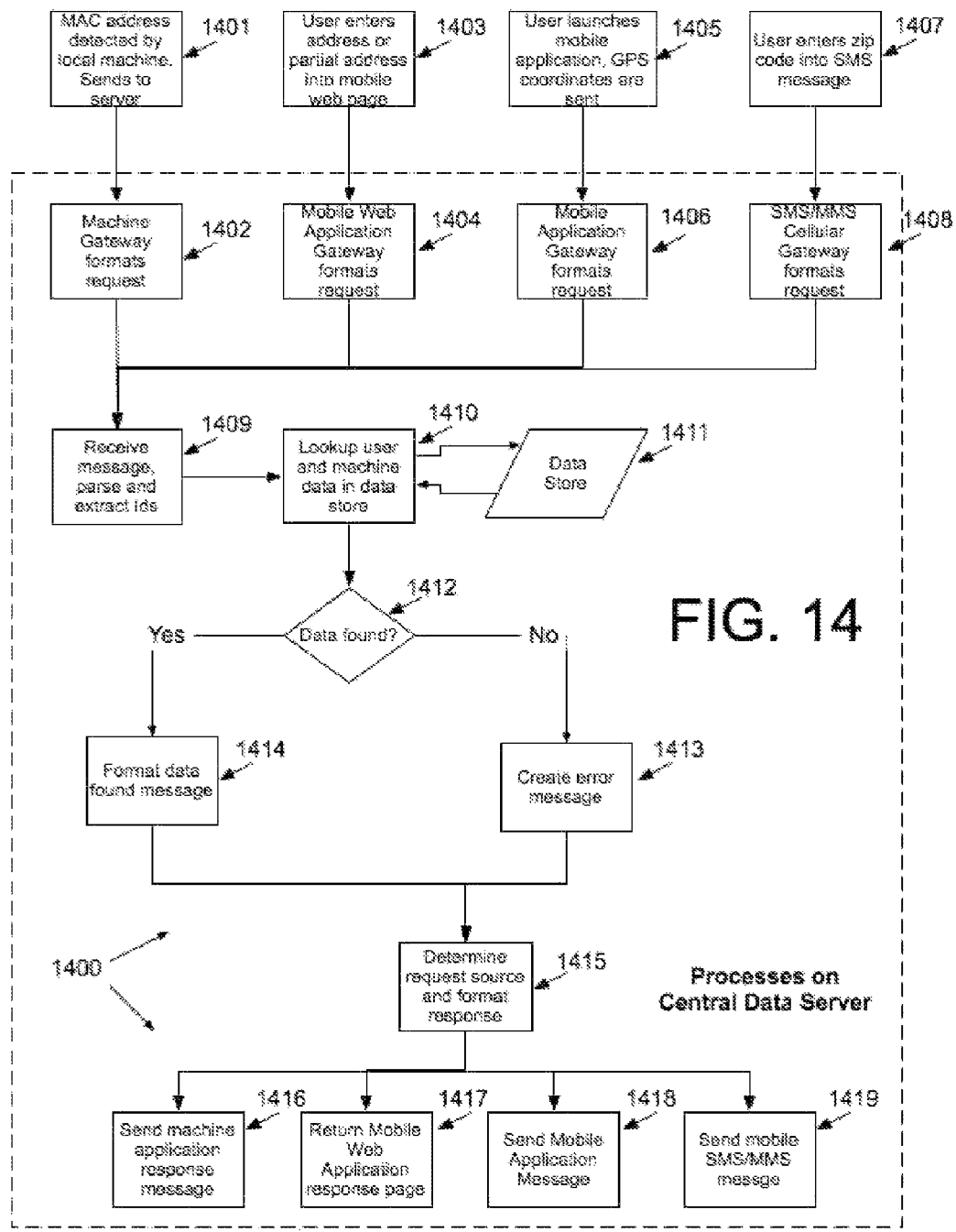
FIG. 14 is a software block diagram of a preferred "mobile device purchasing process."

Subroutine 1400 (FIG. 14) illustrates the preferred method of broadcastings various messages to users that are detected to be in close proximity by any part of the system or the user updates their location to any part of the system.

The subroutine can begin if a user joins a machine's WLAN in step 1401. In order to do this, the WLAN checks the mobile device's MAC address that is used to authorize the device on the Local Area Network. This MAC address is stored in a registered user's data record. This information is sent to a central user and received by the machine gateway in step 1402. This step formats the message and sends it on to step 1409 that receives the message, parses it and extracts identifiers and user information. Alternatively, a user may enter their location into the mobile website via their mobile device's browser. The location can be GPS coordinates, zip code or any other information used to identify location in step 1403. This information is sent to the mobile web application gateway that compiles the information into a request message in step 1404. This information is sent to step 1409 where it is received and handled. The user may also launch a mobile application installed on their mobile device which reads the GPS coordinates of a mobile device that has Global Positioning System technology enabled. This information is sent in step 1405 to the mobile application gateway that receives this information in step 1406 and formats a request that is sent to step 1409 where it is processed. A user may also send an SMS message via their cell phone carrier services in step 1407 where it is receive by the SMS Cellular Gateway in step 1408 where the message is converted to a request message that is sent to step 1409 where it is parsed to extract all identifiers, location keys and user information. This information is used in step 1410 to create a query or series of queries it sends to the data store 1411 that determines the user's location and the closest machine or units to that user and associated user information that pulls up relevant information to that user and that machine. This information may contain details about the machine, its contents and any relevant messages such as promotions, sales or inventory status. The data store 1411 returns the requested data which is analyzed in step 1412. If no machine was located in the set proximity of the user and no user information was found, an error message is created in step 1413 and sent to step 1415 where the request source is determined and the return message is formatted correctly for the source that requested the information. Step 1416 sends responses back to requests that were made through the Remote Machine or Unit Gateway. Step 1417 returns responses back to requests that were made through the Mobile Web Application. Step 1418 handles all responses to requests that were made through the Mobile Applications Gateway. Step 1419 handles all messages made through the SMS/MMS Cellular Gateway.

Figure 15:
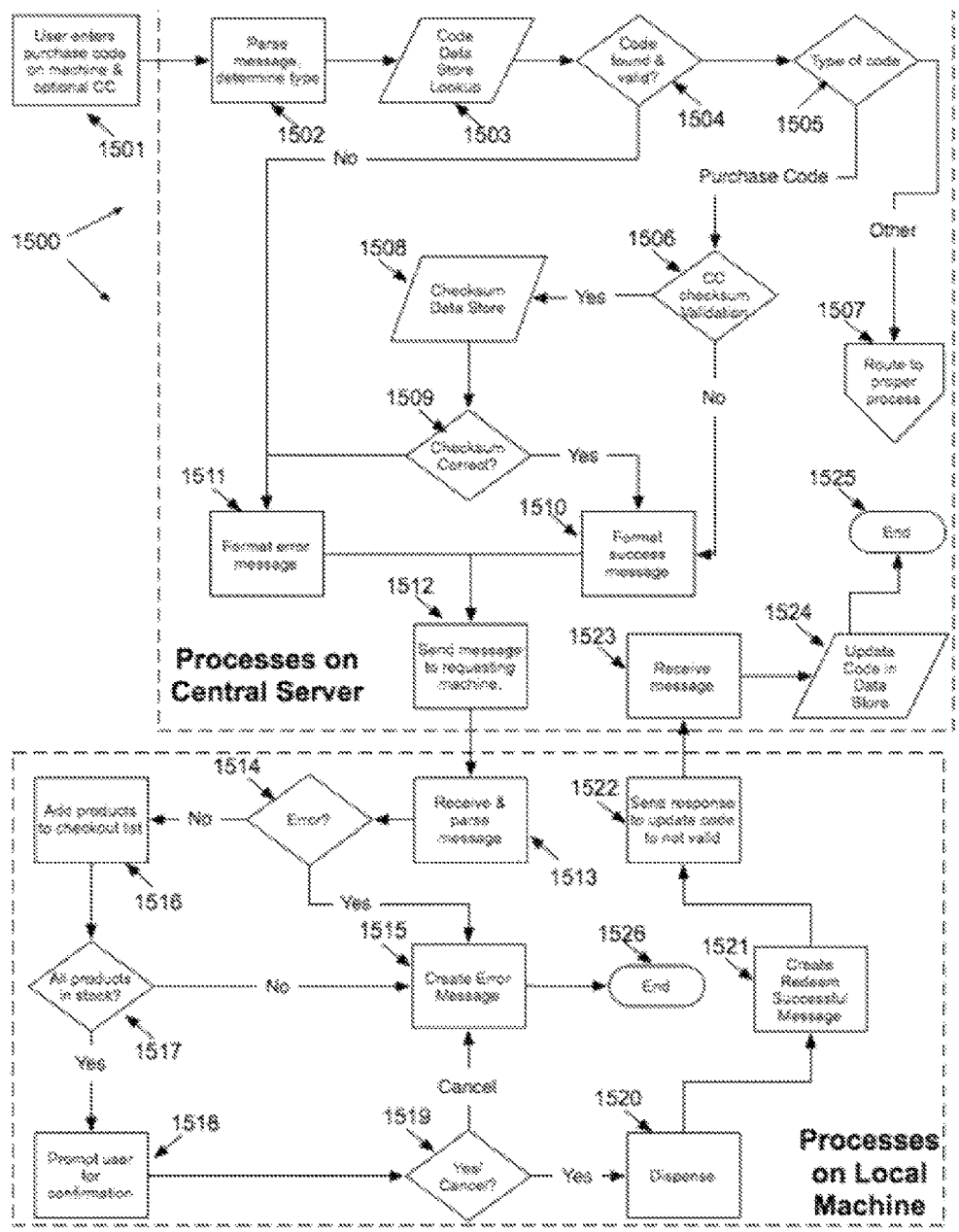
FIG. 15 is a software block diagram of a preferred "retrieving merchandise purchased through a mobile device."

Subroutine 1500 (FIG. 15) illustrates the preferred method of retrieving products from a vending machine or automated retail store by entering in a code that is verified on a central server before dispensing the products. Purchases made through a mobile device are linked to a specific machine to which purchased merchandise can be received. This information is stored in a data store on the central server (FIG. 13) and then the information is synchronized with the machines in the field. This places a temporary hold on the merchandise so it cannot be sold to another consumer. After the set time, the purchase code expires, the hold on the merchandise is lifted and the merchandise becomes available again. The user may apply for a credit or refund at this time.

The process begins when a user enters and submits a purchase redemption code into a vending machine or automated retail 1501. The machine sends this message to the central server where the message is received and parsed by step 1502. This step extracts the code where it is used to look up the associated information in the data store 1503. Step 1504 determines if the code was found or not and if the code was still valid. If it was not found or not valid, an error message is formed in step 1511 before step 1512 sends the message to the machine that made the request.

If step 1504 determines a matching code was found, the process proceeds to step 1505 which reviews the retrieved information from the data store to determine which type of code is being processed. If the code is a purchase code, the process continues to step 1506. Any other code and the process is routed to the correct subroutine 1507. Step 1506 checks the administrative settings to determine if a Credit Card authorization was required. If not, the process continues to step 1510.

If it was, the user was prompted to swipe the card they bought the product with and a hash checksum was created. This checksum is tested against the checksum stored in the data store 1508. Step 1509 tests the result. If the checksum did not match the stored value, an error message is created in step 1511, otherwise, a correct match will lead to a success message being created in step 1510. This message is then routed to the requesting machine in step 1512. Step 1513 resides on the local machine that made the request. It receives the message from the central server and parses it. Step 1514 checks if the returning message was an error message. If it was, an error message is displayed to the user in step 1515. The process then terminates in step 1526. If the returned message from the central server was not an error message, the machine begins the dispensing process in step 1516. Here the purchased items identification numbers associated with the purchase code that were retrieved from the database in step 1503. Step 1517 verifies that the purchased items are all in stock and available to be dispensed. This is a precautionary step as the inventory was already reserved in a previous procedure. If some of the products are missing, an error message is displayed to the user in step 1515 and the process terminates in step 1526. If all of the products are available to be dispensed, step 1518 displays this information to the user for verification. Step 1519 takes user input to continue or cancel. If the user decides to not vend the purchased merchandise or if there was an error in the list of products, they can cancel the operation and proceed to step 1015 where a user message is displayed and the process then terminates in step 1526. If the user wishes to continue with the vending process, it continues in step 1520 and the machine vends the merchandise. Step 1521 displays a confirmation to the user and formats a return message to the central server to update the purchase code status. The process then continues to step 1522 that sends a return message to the central server where it is received by step 1523. Step 1524 updates the status of the purchase code in the data store so it cannot be used again. The process terminates in step 1525.

From the foregoing, it will be seen that this invention is well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed:

1. A vending system comprising at least one vending machine, retail display, or automated retail store, the vending system comprising:
   a display module containing items to be vended, the display module physically comprising a plurality of physical displays in which items to be vended are visibly housed;
   a computer for activating and controlling the vending system and said module, and receiving and processing customer messages from one or more mobile devices;
   software for controlling said computer; and
   a visual display controlled by said software for establishing a virtual screen for inputting customer data and selections, wherein the virtual screen comprising virtual representations of the physical displays of the physical display module arranged in at least one recognizable pattern, whereby images appearing on the virtual screen selected and viewed by the user correspond to actual items available in the plurality of physical displays of the display module of the at least one vending machine, wherein the computer is configured to transmit information to the one or more mobile devices to generate the virtual screen on the one or more mobile devices.

2. The vending system of claim 1 further comprising a central server connected to the at least one vending machine, wherein data corresponding to the items to be vended in the at least one vending machine and the central server is synchronized.

3. The vending system of claim 2 wherein the customer messages include a customer identifier element that allows the at least one vending machine or central server to send a response back to the mobile device from which the message originated.

4. The vending system of claim 3 wherein the customer identifier element includes one of a mobile number, mobile MAC address, user name, and machine name.

5. The vending system of claim 1 wherein the customer message includes one of a SMS message and a MMS message transmitted on a mobile carrier's network or through a cellular service's data network.

6. The vending system of claim 1 wherein the customer message includes a mobile web application message.

7. The vending system of claim 1 wherein the at least one vending machine includes labels located thereon and including information corresponding to one of an item to be vended, a promotion, and the at least one vending machine, wherein the information can be input into the customer message.

8. The vending system of claim 1 wherein the labels can include one of human readable alphanumeric characters, matrix codes, two-dimensional bar codes, and RFIDs.

9. The vending system of claim 1, wherein the computer is configured to simultaneously receive and process customer data and selections input on the virtual screen on the visual display and/or a plurality of customer messages from the one or more mobile devices.

10. A method for vending products within a vending machine to a user, the vending machine comprising a display module containing products to be vended, the display module physically comprising a plurality of physical displays in which products to be vended are visibly housed, a computer for activating and controlling the display module and receiving and processing user requests from a plurality of mobile devices; software for controlling the computer; and a visual display for inputting user data and selections, the method comprising the steps of:
   receiving user data and/or selections input at the visual display of the vending machine, wherein the user selections correspond to products to be vended; and
   receiving user requests from a plurality of mobile devices, wherein the user request correspond to one of the products to be vended; and
   broadcasting messages and notifications corresponding to the vending machine and receivable by one or more of the plurality of mobile devices in proximity to the vending machine, wherein the messages and notifications include information corresponding to the inventory of products to be vended.

11. The method of claim 10 wherein the user requests include a user identifier element that allows the vending machine to send a response back to the mobile device that sent the request, wherein the user identifier element includes one of a mobile number, mobile MAC address, user name, and machine name.

12. The method of claim 10 wherein the step of receiving user requests includes receiving one of a mobile web application message and a SMS or MMS message transmitted on a mobile carrier's network or through a cellular service's data network.

13. The method of claim 10 wherein the vending machine includes labels located thereon and including information corresponding to one of a product to be vended, a promotion, and the vending machine, wherein the information can be input into the user request.

14. The method of claim 10 wherein the labels can include one of human readable alphanumeric characters, matrix codes, two-dimensional bar codes, and RFIDs.

15. The method of claim 10 further comprising the step of transmitting information corresponding to a product to be vended from the vending machine in response to a user request from a mobile device to the mobile device from which the user request was sent.

16. The method of 10 further comprising the step of transmitting information to a mobile device that generates a virtual screen on the mobile device display screen comprising virtual representations of the physical displays of the vending machine arranged in at least one recognizable pattern, whereby images appearing on the virtual screen selected and viewed by the user correspond to actual items available in the plurality of physical displays of the display module of the vending machine.

17. The method of claim 15 further comprising the step of reserving a product to be vended in the vending machine in response to a user request from a mobile device.

18. The method of claim 17 further comprising the steps of receiving a predetermined code corresponding to the reserved product, and dispensing the reserved product from the vending machine upon.

19. The method of claim 17 further comprising the steps of receiving a request to purchase a product to be vended in the vending machine from a mobile device, confirming payment from the mobile device and assigning a predetermined code to purchased product, wherein the purchased product is held in reserve in the vending machining until dispensed in response to entry of the predetermined code.

20. A method for vending products within a vending machine to a user in a vending system comprising a central server connected to one or more vending machine, the one or more vending machines comprising a display module containing products to be vended, the display module physically comprising a plurality of physical displays in which products to be vended are visibly housed, a computer for activating and controlling the display module and receiving and processing user requests from a plurality of mobile devices; software for controlling the computer; and a visual display for inputting user data and selections, the method comprising the steps of:
receiving user data and/or selections input at a visual display of one or more vending machines, wherein the user selections correspond to products to be vended in the vending machine;
receiving user requests from a plurality of mobile devices, wherein a user request corresponds to one of the one or more vending machines, promotions at one of the one or more vending machines, and products to be vended in one of the one or more vending machine; and
receiving user location information and identifying the closest vending machine based on the user's location information that has the product to be vended for which information was requested, and transmitting information to the mobile device that generates a virtual screen on the display screen of the mobile device comprising virtual representations of the physical displays of the vending machine arranged in at least one recognizable pattern, whereby images appearing on the virtual screen selected and viewed by the user correspond to actual items available in the plurality of physical displays of the display module of the vending machine.

21. The method of claim 20 further comprising the step of synchronizing data between the central server and each of the one or more vending machines corresponding to the products to be vended in each of the one or more vending machines.

22. The method of claim 20 wherein the user requests include a user identifier element that allows the vending machine and/or central server to send a response back to the mobile device that sent the request, wherein the user identifier element includes one of a mobile number, mobile MAC address, user name, and machine name.

23. The method of claim 20 wherein the step of receiving user requests includes receiving one of a mobile web application message and a SMS or MMS message transmitted on a mobile carrier's network or through a cellular service's data network.

24. The method of claim 20 wherein each of the one or more vending machines include labels located thereon and including information corresponding to one of a product to be vended, a promotion, and the vending machine, wherein the information can be input into the user request.

25. The method of claim 20 wherein the labels can include one of human readable alphanumeric characters, matrix codes, two-dimensional bar codes, and RFIDs.

26. The method of claim 20 further comprising the step of transmitting information corresponding to a product to be vended from the vending machine in response to a user request from a mobile device to the mobile device from which the user request was sent.

27. The method of claim 26 further comprising the step of receiving user location information and identifying the closest vending machine based on the user's location information that has the product to be vended for which information was requested.

28. The method of claim 27 further comprising the step of reserving a product to be vended in the vending machine in response to a user request from a mobile device.

29. The method of claim 28 further comprising the steps of receiving a predetermined code corresponding to the reserved product, and dispensing the reserved product from the vending machine upon.

30. The method of claim 20 further comprising the step of receiving user location information and identifying registered users within a predetermined proximity of one of the one or more of the vending machines and broadcasting messages and notification corresponding to one of machine information, machine inventory information, machine rewards, and machine discounts.

31. The method of claim 28 further comprising the steps of receiving a request to purchase a product to be vended in the vending machine from the mobile device, confirming payment from the mobile device and assigning a predetermined code to the purchased product, wherein the purchased product is held in reserve in the vending machining until dispensed in response to entry of the predetermined code.

* * * * *